US012400521B2

(12) United States Patent
Boese et al.

(10) Patent No.: US 12,400,521 B2
(45) Date of Patent: Aug. 26, 2025

(54) ELECTRONIC GAME SYSTEMS AND METHODS WITH MULTIPLE METAMORPHIC FEATURES

(71) Applicant: Aristocrat Technologies, Inc., Las Vegas, NV (US)

(72) Inventors: Eric Boese, Decatur, GA (US); Bradley Schultz, Brookhaven, GA (US); Brandon Richard, Lawrenceville, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 317 days.

(21) Appl. No.: 18/298,134

(22) Filed: Apr. 10, 2023

(65) Prior Publication Data

US 2023/0334953 A1 Oct. 19, 2023

Related U.S. Application Data

(60) Provisional application No. 63/331,023, filed on Apr. 14, 2022.

(51) Int. Cl.
*G07F 17/32* (2006.01)

(52) U.S. Cl.
CPC ...... *G07F 17/3267* (2013.01); *G07F 17/3211* (2013.01)

(58) Field of Classification Search
CPC ............. G07F 17/3267; G07F 17/3211; G07F 17/3213; G07F 17/326; G07F 17/34
See application file for complete search history.

(56) References Cited

U.S. PATENT DOCUMENTS

2016/0042597 A1 2/2016 Olive
2022/0084352 A1* 3/2022 Ludwick ............. G07F 17/3267
2023/0015353 A1* 1/2023 Uberuaga .......... G07F 17/3213
2023/0106453 A1* 4/2023 Visser ..................... G06F 7/588 463/31

(Continued)

OTHER PUBLICATIONS

Carla Vegas Loving Aussie, https://www.youtube.com/watch?v=hvR5Rh7auS8, Happy Chance Cat, 1 page.

(Continued)

*Primary Examiner* — Ronald Laneau
(74) *Attorney, Agent, or Firm* — Armstrong Teasdale LLP

(57) ABSTRACT

An electronic gaming machine includes a display device that displays an electronic game including a base game, a feature game, and metamorphic features, and a game controller that executes instructions stored in a memory. The instructions, when executed, cause the game controller to determine that the feature game is triggered based on a result of the base game and initiate the feature game; identify one or more of the metamorphic features to be active during the feature game; cause display of an indication of the active metamorphic features; for each feature symbol appearing in a play area during the feature game, determine a feature value for each active metamorphic feature and add the feature value to a portion of the feature symbol associated with a respective active metamorphic feature; and upon conclusion of the feature game, generate an award total for each active metamorphic feature and provide the award total.

20 Claims, 17 Drawing Sheets

(56) References Cited

U.S. PATENT DOCUMENTS

| | | | | |
|---|---|---|---|---|
| 2024/0087421 A1* | 3/2024 | Walsh | ................. | G07F 17/3267 |
| 2025/0078625 A1* | 3/2025 | Davis | .................. | G07F 17/3213 |

OTHER PUBLICATIONS

PubCard, https://www.youtube.com/watch?v=xfz0Ut06srk, Happy Chance Pig, 1 page.

https://www.prnewswire.com/news-releases/scientific-games-brings-stellar-line-up-of-market-leading-innovation-technology-and-digital-solutions-to-australasian-gaming-expo-300692218.html, Scientific Games Corporation, Aug. 6, 2018, 5 pages.

Sci Games, Ultimate Fire Link, https://www.youtube.com/watch?v=DeCnURCWFY4, c. Sep. 2017.

* cited by examiner

ELECTRONIC GAME SYSTEMS AND METHODS WITH MULTIPLE METAMORPHIC FEATURES

CROSS-REFERENCE TO RELATED APPLICATION

This application claims priority to U.S. Provisional Patent Application No. 63/331,023, filed Apr. 14, 2022, the disclosure of which is hereby incorporated by reference herein in its entirety.

TECHNICAL FIELD

The field of disclosure relates generally to electronic gaming, and more particularly to electronic gaming systems and methods with metamorphic features.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming machine includes at least one display device configured to display an electronic game that includes a base game, a feature game, and a plurality of metamorphic features, and a game controller configured to execute instructions stored in at least one memory. The instructions, when executed, cause the game controller to determine that the feature game is triggered based on a result of the base game and initiate the feature game in response thereto; during initiation of the feature game, identify one or more metamorphic features of the plurality of metamorphic features to be active during the feature game; cause display of a visual indication of the one or more active metamorphic features; for each feature symbol appearing in a play area during the feature game, determine a feature value for each active metamorphic feature and add the feature value to a portion of the feature symbol associated with a respective active metamorphic feature; and upon conclusion of the feature game, generate an award total for each active metamorphic feature and provide the award total for each active metamorphic feature.

In another aspect, a non-transitory computer-readable medium contains instructions stored thereon, which when executed by a processor, cause the processor to control a display device to display an electronic game that includes a feature game, a base game, and a plurality of metamorphic features; determine that the feature game is triggered based on a result of the base game and initiate the feature game in response thereto; during initiation of the feature game, identify one or more metamorphic features of the plurality of metamorphic features to be active during the feature game; control the display device to display a visual indication of the one or more active metamorphic features; for each feature symbol appearing in a play area during the feature game, determine a feature value for each active metamorphic feature and add the feature value to a portion of the feature symbol associated with a respective active metamorphic feature; and upon conclusion of the feature game, generate an award total for each active metamorphic feature and provide the award total for each active metamorphic feature.

In another aspect, a computer-implemented method for providing an electronic game on an electronic gaming device includes controlling a display device to display the electronic game that includes a feature game, a base game, and a plurality of metamorphic features; determining that the feature game is triggered based on a result of the base game and initiating the feature game in response thereto; during initiation of the feature game, identifying one or more metamorphic features of the plurality of metamorphic features to be active during the feature game; controlling the display device to display a visual indication of the one or more active metamorphic features; for each feature symbol appearing in a play area during the feature game, determining a feature value for each active metamorphic feature and adding the feature value to a portion of the feature symbol associated with a respective active metamorphic feature; and upon conclusion of the feature game, generating an award total for each active metamorphic feature and providing the award total for each active metamorphic feature.

DETAILED DESCRIPTION

Figure 1:
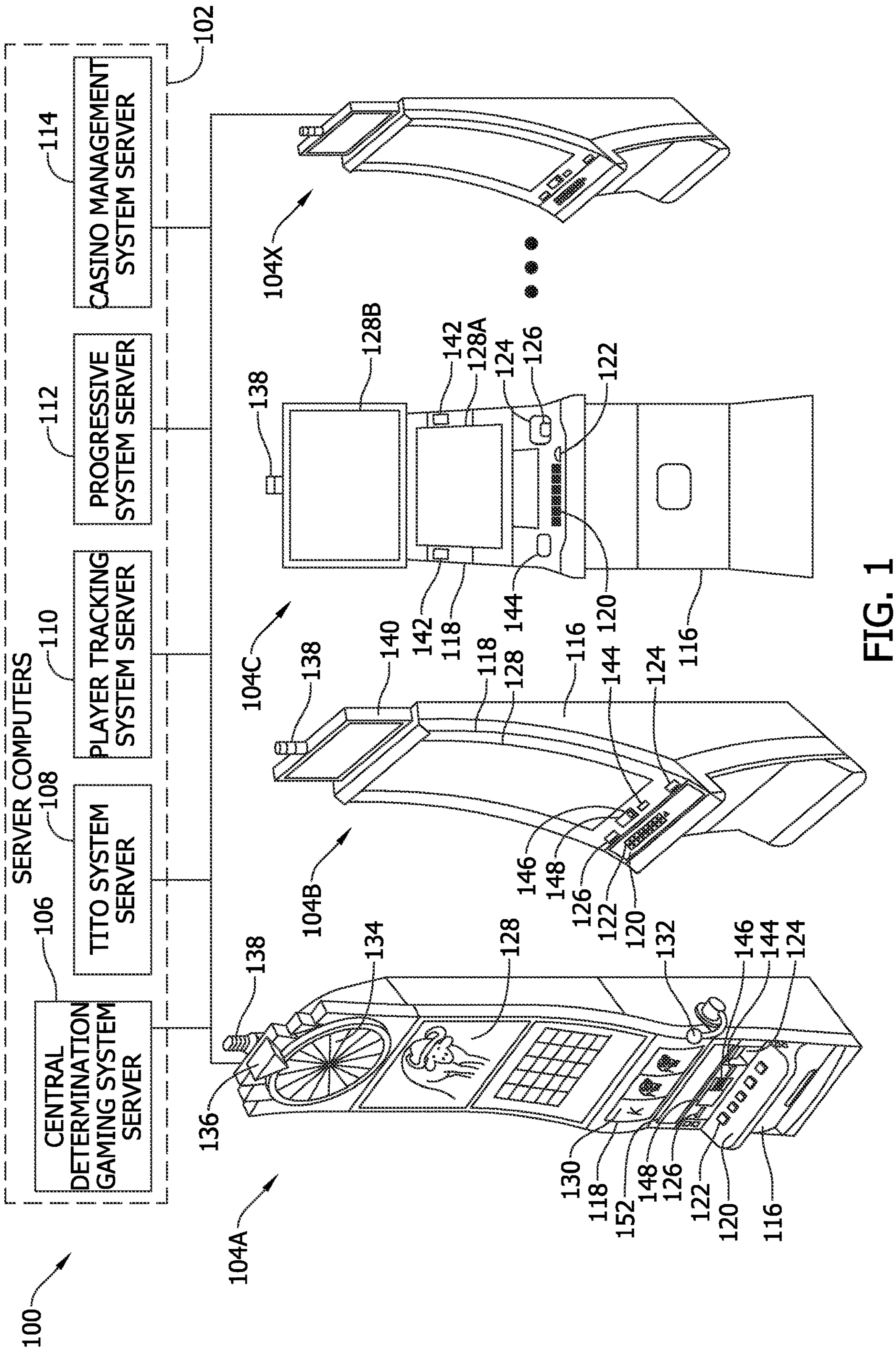
FIG. 1 is an exemplary diagram showing several EGMs networked with various gaming related servers.

In conventional reel-based games, in a given game outcome, a gaming device may display one or more feature symbols or objects in a viewable portion of a set of reels (e.g., within a play area) along with other base symbols or objects. Feature symbols that appear in the play area may trigger a feature game (e.g., a bonus game or a special mode). The feature game may be triggered upon a single feature symbol or a threshold count of feature symbols (e.g., six feature symbols) appearing within the play area in a result of a base reel game. In some instances, the gaming device also generates additional feature symbols that are added to the play area in a given result of the feature game. At the conclusion of the feature game, an award value associated with the feature symbols displayed in the play area may be generated and provided to a player. The variability and flexibility in providing awards and displaying supplemental visual effects in conventional reel-based games remain limited, however. A need exists to address these limitations to facilitate increased variability in the game play while reducing or maintaining the computational resources used and while doing so during game play.

Electronic gaming devices, systems and methods are described herein that implement a symbol-driven mechanic in an RNG-based gaming environment in which multiple metamorphic features are utilized to trigger a feature game (e.g., a hold-and-spin bonus reel game with a free spin reset) in an electronic game and/or to provide award values associated with each feature symbol that appears during the feature game. An electronic gaming device may initiate the feature game during base game play based on random number generator (RNG) outcomes that are generated in response to one or more feature symbols appearing in a result of the base game. When the feature game is initiated, one or more of the metamorphic features may be identified to be active, individually or together, during the feature game. The feature symbols that are displayed and/or appear during the feature game are tied to each of the active metamorphic features, and during feature game play, each active metamorphic feature causes the electronic game to add a cash-on-reels feature value to each feature symbol. As such, when multiple metamorphic features are active during the feature game, each feature symbol may contain multiple feature values. Furthermore, during the feature game, a player may have the opportunity to activate initially inactive metamorphic features, which provides the player with additional cash-on-reels feature values added to each feature symbol. The player may also have the opportunity to reset a number of free spins provided during the feature game. The opportunities to unlock the additional features during the feature game may be generated in response to new feature symbols that appear during the feature game. The additional opportunities improve the game variability and are available to increase the potential awards available to the player during the feature game.

The technical improvements provided herein include, inter alia, increasing the flexibility in providing opportunities to trigger a feature game, varying the randomness (e.g., increasing the probability) that the feature game is triggered, increasing the variability and flexibility in providing awards during the feature game, increasing the opportunities available to the player to unlock additional features during the feature game, and/or improving the user interface by displaying an increased amount of information to the user with a limited display area. This is achieved by providing multiple metamorphic features that are tied to each feature symbol that lands in a play area during gameplay. In some implementations, a game generates one or more RNG outcomes to determine whether to trigger the feature game for each metamorphic feature and in response to one or more feature symbols appearing in a result of the base game. The probability of triggering the feature game is linked to the number of metamorphic features tied to each feature symbol, and the probability of triggering the feature game may increase when a greater number of metamorphic features are utilized. Additionally and/or alternatively, during the feature game, an award value is added to each feature symbol that is displayed and/or appears for each metamorphic feature that is active during the feature game. The player has the opportunity for multiple metamorphic features to be active at the beginning of the feature game and/or during the feature game. When multiple metamorphic features are active, multiple feature values are added to each feature symbol, thereby increasing the total award value generated and provided to the player at the conclusion of the feature game.

Visual feedback via one or more metamorphic graphical elements may be displayed in conjunction with the feature symbols to facilitate improving the usability of electronic gaming devices and/or improving the capability of the user interface to display information to a player during game play. Each feature symbol that appears in the play area may cause animation of the metamorphic graphical elements to be displayed, creating the perception that the player is nearing triggering the feature game. The metamorphic graphical elements are each associated with one of the metamorphic features and may be used to indicate the status of each metamorphic feature during the feature game. If the feature game is triggered, one or more metamorphic graphical elements may advance to a state or level or be displayed in conjunction with objects or symbols to indicate whether the associated metamorphic feature is active during the feature game. The metamorphic graphical elements may dynamically or periodically change during the feature game if an associated metamorphic feature becomes active.

Certain technical problems are associated with using a symbol-driven mechanic within an RNG-based gaming environment in conjunction with multiple metamorphic features each tied to each feature symbol appearing during gameplay. For example, randomly determining whether to trigger the feature game in response to one or more feature symbols appearing in a result of the base game and based on the number of metamorphic features increases the degree of randomness associated with a feature game being triggered, and may cause larger payouts to be awarded by increasing the feature game trigger rate. Moreover, providing the opportunity for a player to achieve multiple feature values on each feature symbol that is displayed and/or appears during the feature game based on the number of metamorphic features that are active during the feature game may increase the payout volatility of the electronic game. Thus, a gaming machine implementing the subject matter described herein must include proper control functions to comply with gaming regulations, such as achieving a designated game return to player ("RTP"), and managing volatility of payouts. These technical problems are unique to gaming technology that uses multiple metamorphic features with a symbol-driven mechanic in an RNG-base gaming environment, and are not presented in conventional gaming devices that do not provide the functionality described herein. As conventional gaming devices have not faced the technical problems presented by the gaming technology described herein, no technical solution to these technical problems exists.

In view thereof, in order to solve the technical problems presented by tying multiple metamorphic features to each feature symbol that appears during gameplay, the gaming machine described herein provides various tools for managing volatility and RTP in a computationally-effective way, while also enabling improved usability and enhanced user experience. For example, the gaming machine described herein facilitates controlling and/or managing the degree of randomness that is otherwise increased by generating a chance to trigger a feature game (e.g., by an RNG outcome) in response to one or more feature symbols appearing in a result of the base game and based on the number of metamorphic features. For example, separate weighted tables and/or trigger thresholds may be implemented and assigned to each metamorphic feature and the triggering chances of each weighted table and/or trigger threshold are appropriately controlled to manage an overall "hit rate" of triggering the feature game. Moreover, the gaming machine may implement an additional control layer such that, when multiple RNG outcomes associated with multiple metamorphic features trigger the feature game, that gaming machine determines whether one or more of the associated metamorphic features are active during the feature game. Furthermore, in some example implementations, each feature symbol that appears in the play area in a result of the base game may independently cause the gaming machine to generate an RNG outcome to determine whether to trigger the feature game, and the lookup table used for each RNG outcome is appropriately weighted to regulate the probability that any one RNG outcome triggers the feature game. The gaming machine may also control the payout awards achieved during the feature game, for example, by using separate weighted tables and/or trigger thresholds used to determine whether to activate additional metamorphic features during the feature game. Additionally and/or alternatively, the gaming machine may use feature game weight tables and credit values for determining the feature values added to each feature symbol that are adjusted to better control and balance the RTP.

In view thereof, electronic gaming devices, systems and methods described herein facilitate improving gaming device operation, capability, and user interface features at least by implementing a symbol-driven mechanic in an RNG-based gaming environment in which multiple metamorphic features are utilized to trigger a feature game and/or to provide award values associated with each feature symbol that appears during the feature game. Such improvements introduce technical problems, including at least increasing randomness generated during gameplay and increasing payout volatility. In order to provide a technical solution to these technical problems, the electronic gaming devices, systems and methods described herein provide tools that facilitate managing and/or controlling the degree of randomness and payout volatility during gameplay, for example, by controlling the overall hit rate of triggering the feature game and/or the payout structure attributed to feature symbols that appear during the feature game and are populated with feature values for each active metamorphic feature.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
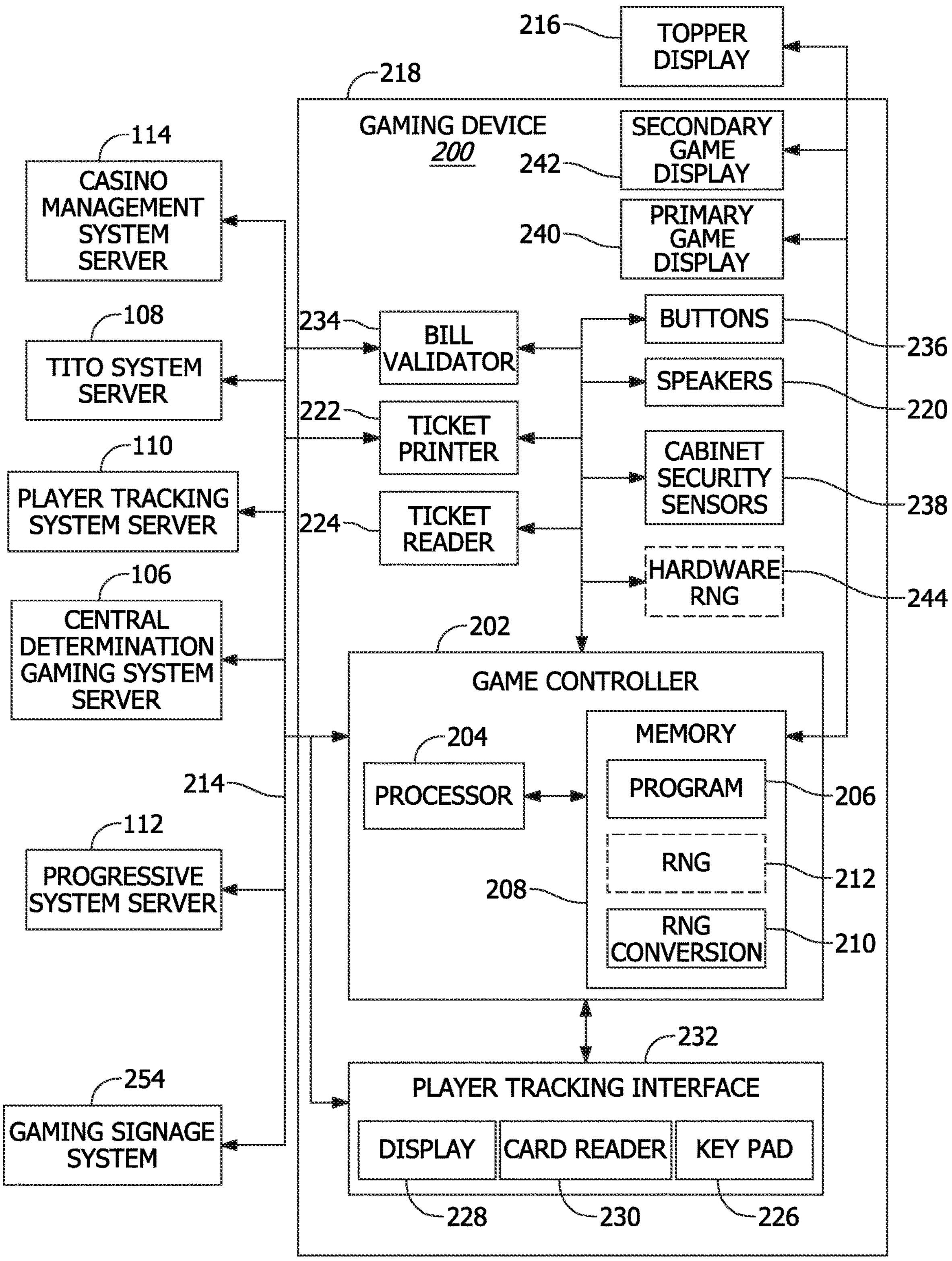
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Although gaming devices 104A-104X are shown in FIG. 1 as upright EGMs, the systems and methods described herein can be used on upright EGMs or table type EGMs as shown in FIG. 4.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In an example embodiment, a tabletop EGM (not shown in FIG. 1) is provided which may be similar to the gaming devices 104. The tabletop EGM may include a horizontal display device that can be used by patrons as a conventional table surface as well as for providing player input (e.g., touchscreen surface, mechanical buttons, or the like) and display output (e.g., virtual wheel, virtual slot reels) for a tabletop game. The tabletop EGM may support participation for multiple players during game play (e.g., as patrons socially meet around the tabletop EGM). Example tabletop EGMs and features are described in greater detail below.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
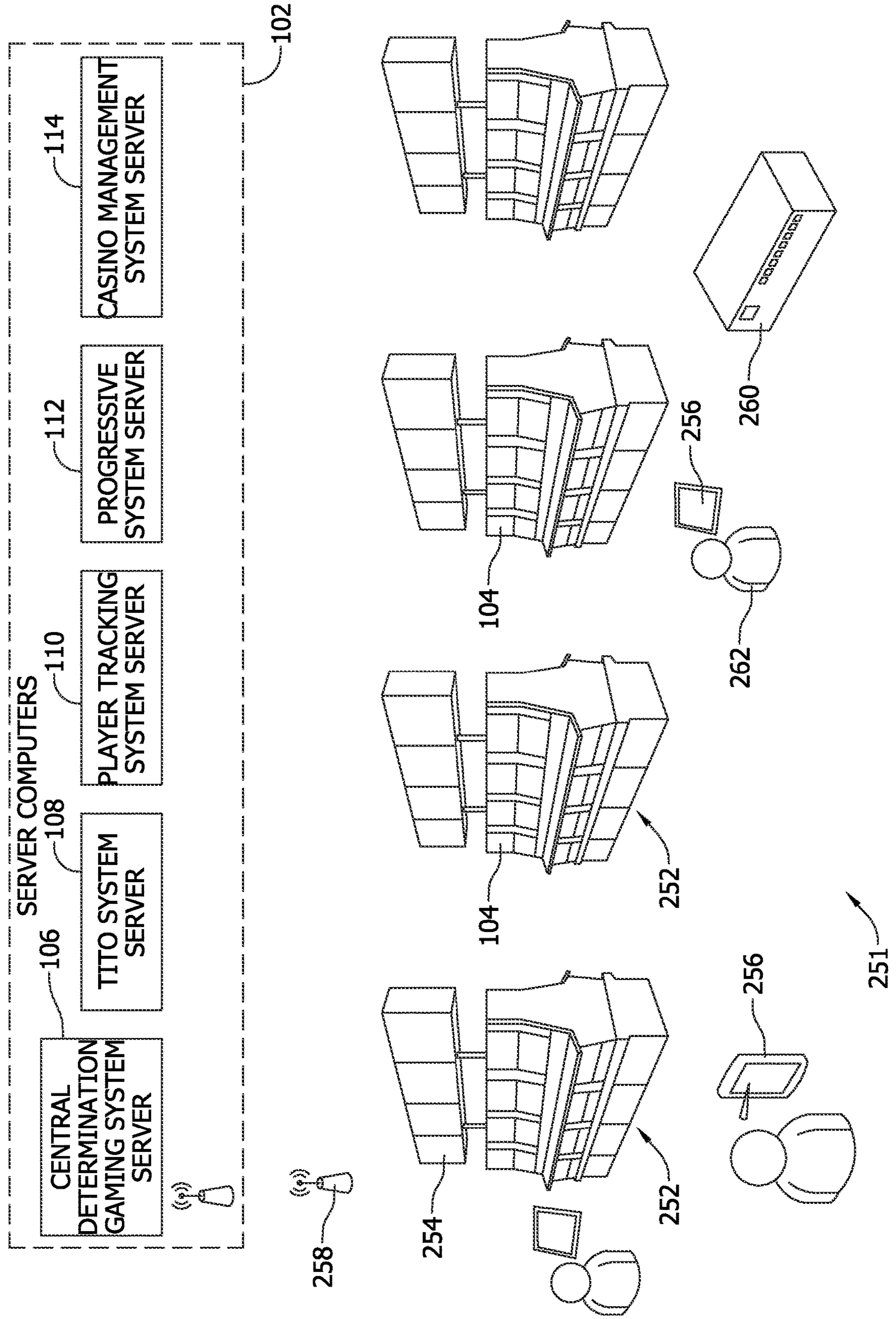
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
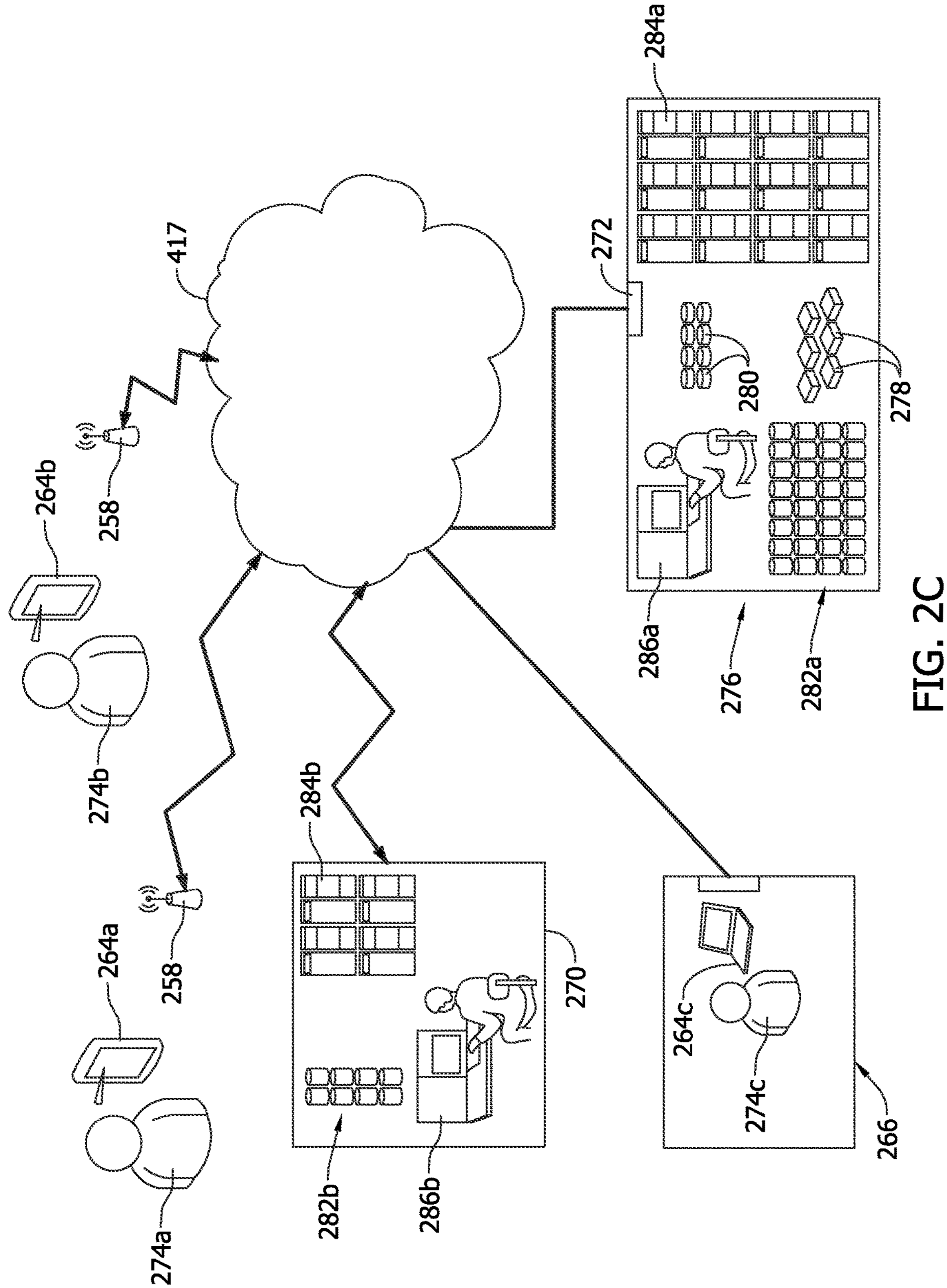
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication.

Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
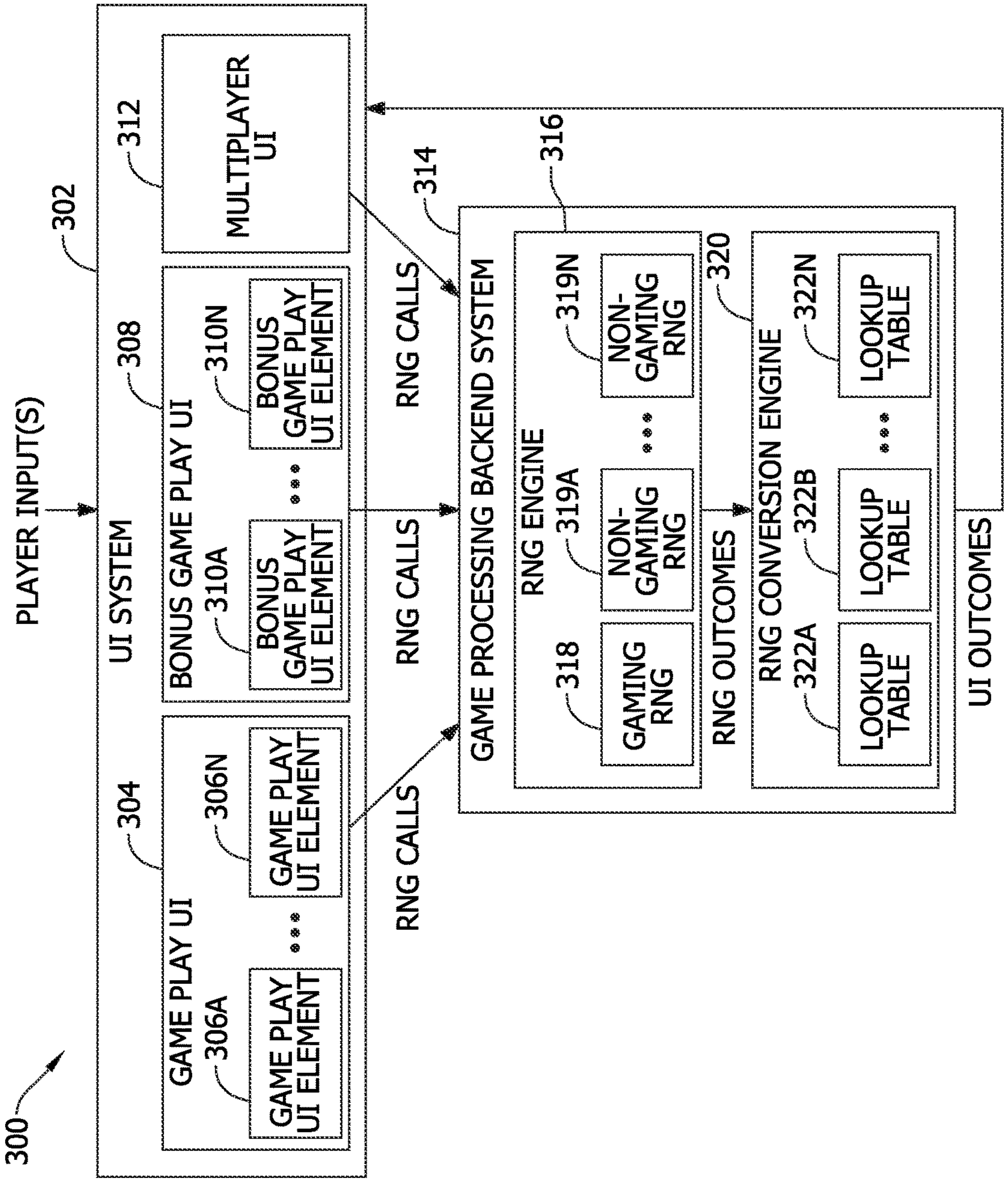
FIG. 3 illustrates, in block diagram form, an embodiment of a game processing architecture algorithm that implements a game processing pipeline for the play of a game in accordance with various embodiments described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
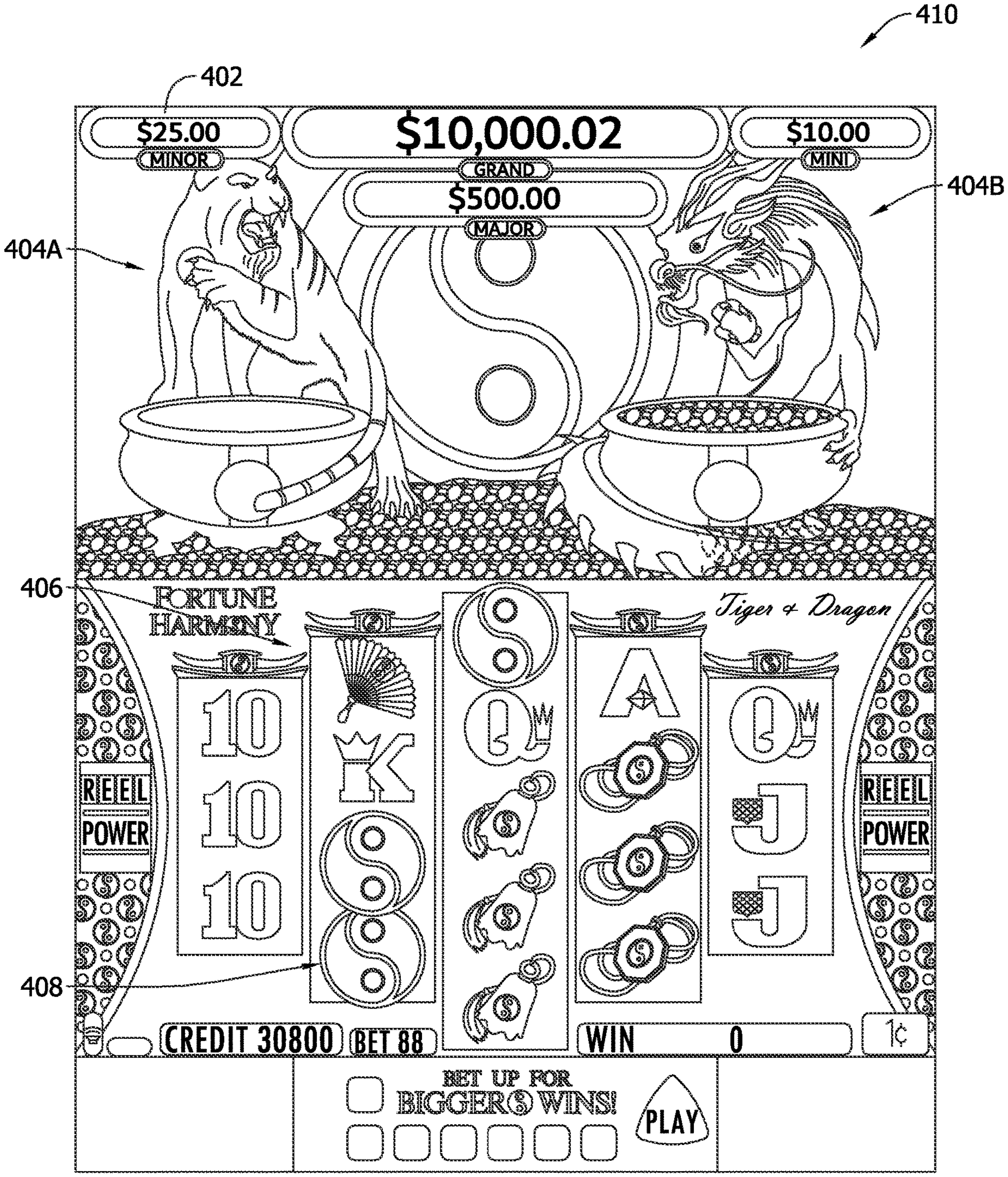
FIGS. 4A-4F are example screenshots or user interfaces of an electronic game that includes metamorphic features with a reel-based game that may be provided by the EGMs shown in FIGS. 1-3 and the mobile devices shown in FIGS. 2B and 2C.

FIGS. 4A-4F are example screenshots 410, 420, 430, 440, 450, 460, respectively, of an electronic game that includes metamorphic features with a reel-based game that may be provided by the EGMs 104A-100X, 200 shown in FIGS. 1-3 and the mobile devices 256, 264 shown in FIGS. 2B and 2C. FIG. 4A illustrates an example embodiment in which the electronic game is a slot-style reel game that utilizes virtual reels displayed in a play area 406, spinning and stopping those reels during base game play and evaluating the outcome of the spin (e.g., in a "ways" evaluation, a pay line evaluation, or the like). In the example shown here, the electronic game is presented via a graphical user interface 402 (e.g., on one or more display devices of game device 200, 256, 264), which displays the play area 406 in a 3-4-5-4-3 configuration (in left-to-right nomenclature). The electronic game also provides two metamorphic display components 404A and 404B. In the example embodiment, metamorphic display component 404A is represented by an image of a tiger and a bowl of gold coins positioned on a left side of the graphical user interface 402 above the play area 406, and metamorphic display component 404B is represented by an image of a dragon and a bowl of gold coins positioned on a right side of the graphical user interface 402 above the play area 406. For purposes of discussion, these two metamorphic display components 404A, 404B may be referred to herein, separately or collectively, as first and second features 404, left and right features 404, primary and secondary features 404, tiger feature 404A and dragon feature 404B, or metamorphic features 404. Further, as presented via the graphical user interface 402, aspects of the features 404 may be distinguished by color. For example, aspects the tiger feature 404A may be shown in green and aspects of the dragon feature 404B may be shown in red. While two metamorphic features 404 are shown in these examples, it should be understood that more metamorphic features 404 are also possible (e.g., three metamorphic features, four metamorphic features, five metamorphic features, and so on). Further, while the below examples are described as being performed by the gaming device 200, the described electronic game and associated metamorphic features may be performed by other gaming devices, such as gaming devices 100A-100X, 256, 264. The gaming device may perform operations to control gameplay and cause display of the described electronic game and associated metamorphic features via a game controller (e.g., game controller 202 shown in FIG. 2A) that may include one or more processors (e.g., processors 204 shown in FIG. 2A) operatively coupled to a memory (e.g., memory 208 shown in FIG. 2A).

The screenshot 410 shown in FIG. 4A illustrates the results of a reel spin during base game play. In the example embodiment, the electronic game uses virtual reel strips that include various basic symbols (e.g., "A", "K", "Q", "J", "10", "9", fan, bell, talisman) as well as feature game symbols (or just "feature symbols") 408. Here, the feature symbols 408 are a yin and yang symbol having two portions, a first portion (e.g., a first or left swirl) and a second portion (e.g., an opposing second or right swirl). The first swirl and the second swirl of each of the feature symbols 408 may be respectively associated with the first and second features 404 and the respective association of the first and second swirls may be distinguished by color. In the example embodiment, the first swirl is associated with the tiger feature 404A and is shown in green. The second swirl is associated with the dragon feature 404B and is shown in red. During base game play, the feature symbols 408 are treated as "wild" symbols for purposes of evaluating a reel spin during award determination. Further, these feature symbols are also used for the metamorphic functionality described herein.

During the base game, the appearance of one or more feature symbols 408 in a spin result triggers display of animation of one or more of the metamorphic features 404. In the example embodiment, the appearance of one or more feature symbols 408 provides a chance to trigger a feature game. More specifically, when one or more feature symbols 408 appears in a spin result, the gaming device 200 displays a metamorphic build animation to either or both of the metamorphic features 404 (e.g., showing a coin being added to each of the left and right side bowls, showing an animation flowing from the feature symbols 408 to each of the features 404, or the like), thereby providing a visual indication to the player that the spin outcome, and particularly the appearance of the feature symbols 408, is providing a chance to trigger the feature game. In conjunction with the metamorphic animation, the gaming device 200 also determines whether or not to trigger the feature game. In some embodiments, the gaming device 200 may provide a single chance for triggering the feature game whenever one or more feature symbols 408 appear (e.g., a chance for the tiger metamorphic 404A to trigger the feature game, or a chance for dragon metamorphic 404B to trigger the feature game). In other embodiments, the gaming device 200 may provide a single chance for each of the two metamorphic features 404 to trigger the feature game whenever one or more feature symbols 408 appear (e.g., a chance for the tiger metamorphic 404A to trigger the feature game and a chance for the dragon metamorphic 404B to trigger the feature game). In some embodiments, the gaming device 200 may provide a chance for each feature symbol 408 that appears (e.g., three chances for either of the metamorphics 404 to trigger the feature game when three feature symbols 408 appear, such as shown in FIG. 4A, or three chances for each of the metamorphics 404A, 404B to trigger the feature game when three feature symbols 408 appear).

In some embodiments, the gaming device 200 generates an RNG output for each chance to trigger the feature game and compares the RNG output to a predetermined trigger threshold or uses the RNG output with a weighted table to determine whether or not the feature game activates. This operation is also referred to herein as generating a "random number generator outcome" or an "RNG outcome." That is, during the base game, the appearance of one or more feature symbols 408 may trigger the gaming device 200 to generate an RNG outcome that determines/indicates whether or not the feature game activates. The number of generated RNG outcomes corresponds to the number of chances triggered by the appearance of one or more feature symbols 408. As described above, in some embodiments, the gaming device 200 may provide a single chance for triggering the feature game whenever one or more feature symbols 408 appear, that is, the gaming device 200 may generate a single RNG outcome when one or more feature symbols 408 appear. In other embodiments, the gaming device 200 may provide a single chance for each of the two metamorphic features 404 to trigger the feature game whenever one or more feature symbols 408 appear, that is, the gaming device 200 may generate two RNG outcomes when one or more feature symbols 408 appear. In some embodiments, the gaming device 200 may provide a chance for each feature symbol 408 that appears, that is, the gaming device 200 may generate a single RNG outcome or two RNG outcomes for each feature symbol 408 that appears. For example, the gaming device 200 may generate three RNG outcomes or six RNG outcomes when three feature symbols 408 appear. For each generated RNG outcome, the weights (e.g., the odds) may be determined and fixed, or may be changed based on previous determinations. For example, the odds may increase with every determination of not triggering the feature game until a maximum limit is reached. After the feature game is triggered, the odds may be reset to a starting value.

When two RNG outcomes are generated representing a chance for each of the two metamorphic features 404 to trigger the feature game, either for one or more feature symbols 408 that appear or for each feature symbol 408 that appears, the gaming device 200 may generate the RNG outcomes by generating two RNG outputs and comparing each RNG output to a predetermined trigger threshold or use each RNG output with a weighted table to determine whether or not the feature game activates. In other embodiments, the gaming device 200 may generate the RNG outcomes by generating a single RNG output and comparing the RNG output to separate predetermined trigger thresholds or use the RNG output with different weighted tables to determine whether or not the feature game activates. In yet other embodiments, the gaming device 200 may generate the RNG outcomes by generating two RNG outputs and comparing the RNG outputs to separate predetermined trigger thresholds or use the RNG outputs with different weighted tables to determine whether or not the feature game activates. In some embodiments, each metamorphic feature 404A, 404B may have a separate trigger threshold or may have a separate weighted table with differing triggering chances.

When the feature game is activated, the gaming device 200 provides a feature game. During activation, the gaming device 200 determines which of the metamorphic features 404A, 404B are "active" at the start of the feature game. In embodiments where the feature game activation chances are provided for each particular metamorphic feature 404A, 404B, then whichever chance caused the feature game to be activated causes that particular metamorphic feature 404A, 404B to be active when the feature game begins. For example, as described above, the gaming device may generate two RNG outcomes each representing a chance for each of the two metamorphic features 404 to trigger the feature game, either for one or more feature symbols 408 that appear or for each feature symbol 408 that appears, and the gaming device 200 may determine that the metamorphic feature 404 associated with the RNG outcome that triggers the feature game is active at the start of the feature game. In such embodiments, it may be possible for both metamorphic features 404A, 404B to be active when the feature game starts (e.g., if both a chance or RNG outcome associated with the tiger metamorphic 404A triggers the feature game and a chance or RNG outcome associated with the dragon metamorphic 404B triggers the feature game). In some embodiments, the gaming device 200 may randomly determine which of the metamorphic features 404 are active when the feature game starts (e.g., based on a weighted table that includes options for one, the other, or both of the features 404 to be active). For example, where both a chance or RNG outcome associated with the tiger metamorphic 404A triggers the feature game and a chance or RNG outcome associated with the dragon metamorphic 404B triggers the feature game, the gaming device 200 may randomly determine that one, the other, or both of the metamorphic features 404 is active when the feature game starts.

Figure 4B:
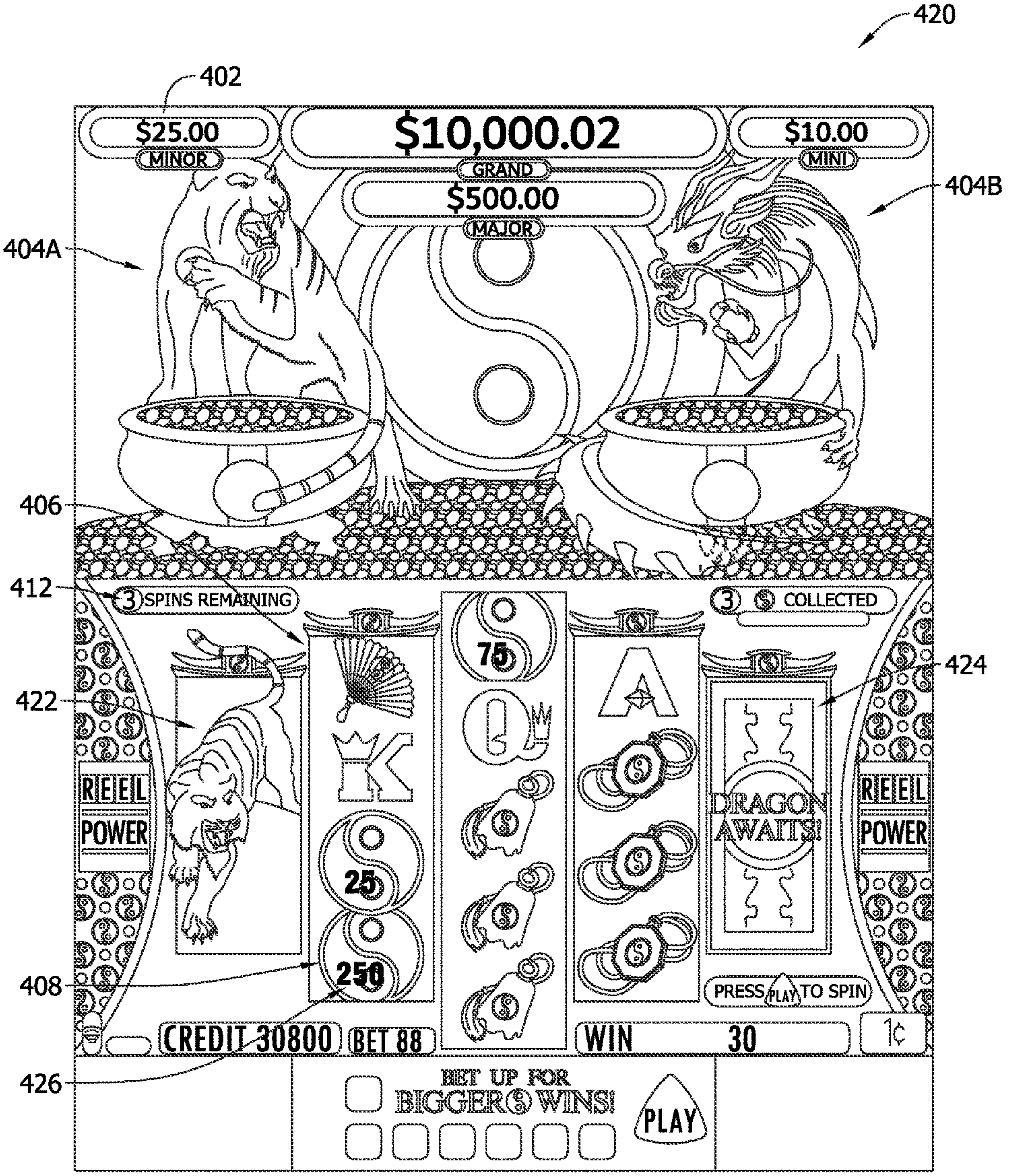

FIG. 4B illustrates an example screenshot 420 after the spin result shown in FIG. 4A. In the example embodiment, the appearance of the feature symbols 408 as shown in screenshot 410 causes activation of the feature game, and more particularly, activation of the feature game with the tiger metamorphic 404A active and the dragon metamorphic 404B as inactive at the start of the feature game. When the feature game starts, the gaming device 200 displays a visual indication via the graphical user interface 402 of the metamorphic(s) 404 that are active and the metamorphic(s) 404 that are inactive at the start of the feature game. In the example embodiment, the gaming device 200 replaces a first reel 422 (e.g., the left-most reel) displayed in the play area 406 with a symbol that indicates to the player that this particular metamorphic feature 404A is active (e.g., an image of a tiger) and replaces the fifth reel 424 (e.g., the right-most reel) with a symbol that indicates to the player that this particular metamorphic feature 404B is inactive (e.g., "dragon awaits"). In the example embodiment, the reels 422, 424 are not directly used during feature game evaluation. In other words, in the example embodiment, the feature game uses only the three remaining inner reels when spinning during the feature game. In other embodiments, the reels 422, 424 may be used during feature game evaluation. For example, during a play of the feature game, the reels 422 and/or 424 may spin and stop and be included in the evaluated result. In some embodiments, only the reel 422 and/or 424 associated with an active metamorphic feature 404 (e.g., the first reel 422 associated with the active tiger metamorphic 404A in the illustrated example) may spin and stop and be included in the evaluated result and the other reel 422 and/or 424 associated with an inactive metamorphic feature 404 (e.g., the fifth reel 424 associated with the inactive dragon metamorphic 404B in the illustrated example) remains replaced by the inactive symbol until the associated metamorphic feature 404 is activated.

In addition to the metamorphic feature 404 activation, the gaming device 200 also adds feature values 426 to each of the existing feature symbols in the play area 406 when the feature game is activated (e.g., each of the three feature symbols 408 that are on the inner three reels when the feature game was activated). As shown in the sequence between FIGS. 4A and 4B, three feature symbols 408 are displayed in the play area 406 during the base game spin outcome (FIG. 4A) and the three feature symbols 408B are "held" in the play area 406 and the feature values 426 are added thereto when the feature game is activated (FIG. 4B). The feature symbols 408 become "cash on reels" symbols during the feature game, where each of the feature values 426 are numerical values (e.g., in credits), jackpot identifiers (e.g., mini, minor, major, grand, or the like), or some other prize identifier. In the example embodiment shown in FIG. 4B, the three feature symbols 408 are populated with values "75", "25", and "250" credit values. Further, since it is the tiger metamorphic 404A that is currently active, the feature values 426 are added to the first swirl portions (e.g., the green swirls) of each of the feature symbols 408. In situations where the dragon metamorphic 404B is additionally and/or alternatively active, the gaming device 200 adds feature values 426 to the second swirl portions (e.g., the red swirls) of each of the feature symbols 408. In situations where both metamorphic features 404A, 404B are active, the feature values 426 are added to both the first and second swirl portions (e.g., both the green swirls and the red swirls) of each feature symbol 408, thereby causing each feature symbol 408 to display two feature values 426. In some embodiments, these two feature values 426 on the same feature symbol 408 may be added into a single feature value. Feature values 426 may be selected from a table of values (e.g., a table of weighted values). In some embodiments, a first table may be used for one of the features 404 (e.g., the tiger feature 404A) and a second table may be used for the other of the features 404 (e.g., the dragon feature 404B). In such embodiments, the first table used for one of the features 404 may be weighted separately (e.g., differently) from the second table used for the other of the features 404.

As such, the screenshot 420 shown in FIG. 4B represents the beginning of the feature game for the player. In the example embodiment, the feature game is a hold-and-spin game with a three-spin reset using the inner three reels, where any positions showing feature symbols 408 are held and all of the remaining symbol positions are respun with each spin. As such, the gaming device 200 provides three free spins to begin the feature game, and resets the number of spins to three whenever a spin results in the appearance of at least one new feature symbol 408. A free spin counter 412 may be displayed on the graphical user interface 402 (e.g., in or adjacent the play area 406 as shown in FIG. 4B) and displays a number of free spins remaining in the feature game. If a spin does not result in the appearance of at least one new feature symbol 408, the free spin counter 412 is reduced (e.g., decremented). If a spin results in the appearance of at least one new feature symbol 408, the free spin counter 412 may remain at three free spins or be replenished to three free spins, depending on whether the free spin counter 412 was previously reduced. In this way, the play of the hold-and-spin feature game continues until either the free spin counter reaches zero or the entire matrix is filled with feature symbols 408 and associated feature values 426. Moreover, in some embodiments, the appearance of at least one new feature symbol 408 during the hold-and-spin feature game may not automatically trigger a free spin reset, and instead may trigger a chance for the number of free spins to be reset. For example, the appearance of at least one new feature symbol 408 during the hold-and-spin feature game may trigger the gaming device 200 to randomly determine, by generating an RNG outcome or RNG outcomes for example, whether the number of free spins are reset, as described above for the appearance of feature symbol(s) 408 during the base game.

Figure 4C:
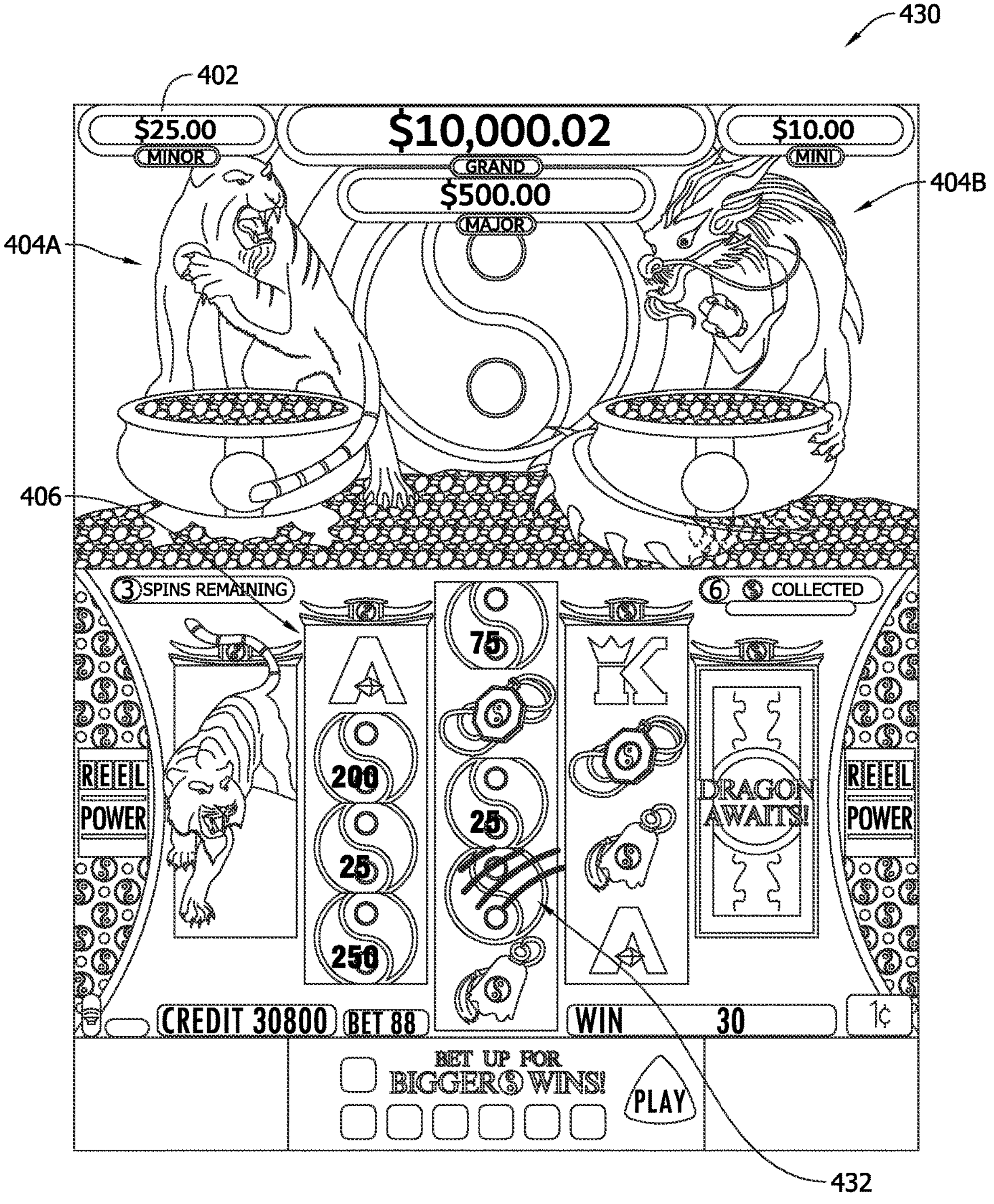

The screenshot 430 shown in FIG. 4C is shown during a first spin during the feature game. During this spin, three new feature symbols 408 appear in the spin result displayed in the play area 406 and are provided with feature values. In the example embodiment, the gaming device 200 provides an animation when populating a new feature symbol 408 with a feature value 426 (e.g., to highlight to the player that a feature value 426 is being added to a particular symbol). In this example, a tiger slash 432 is shown over the feature symbol 408 in the play area 406 right before adding a new feature value 426 to that feature symbol 408. The tiger slash 432 shown in FIG. 4C appears right before the gaming device 200 adds a feature value 426 to that feature symbol 408.

Figure 4D:
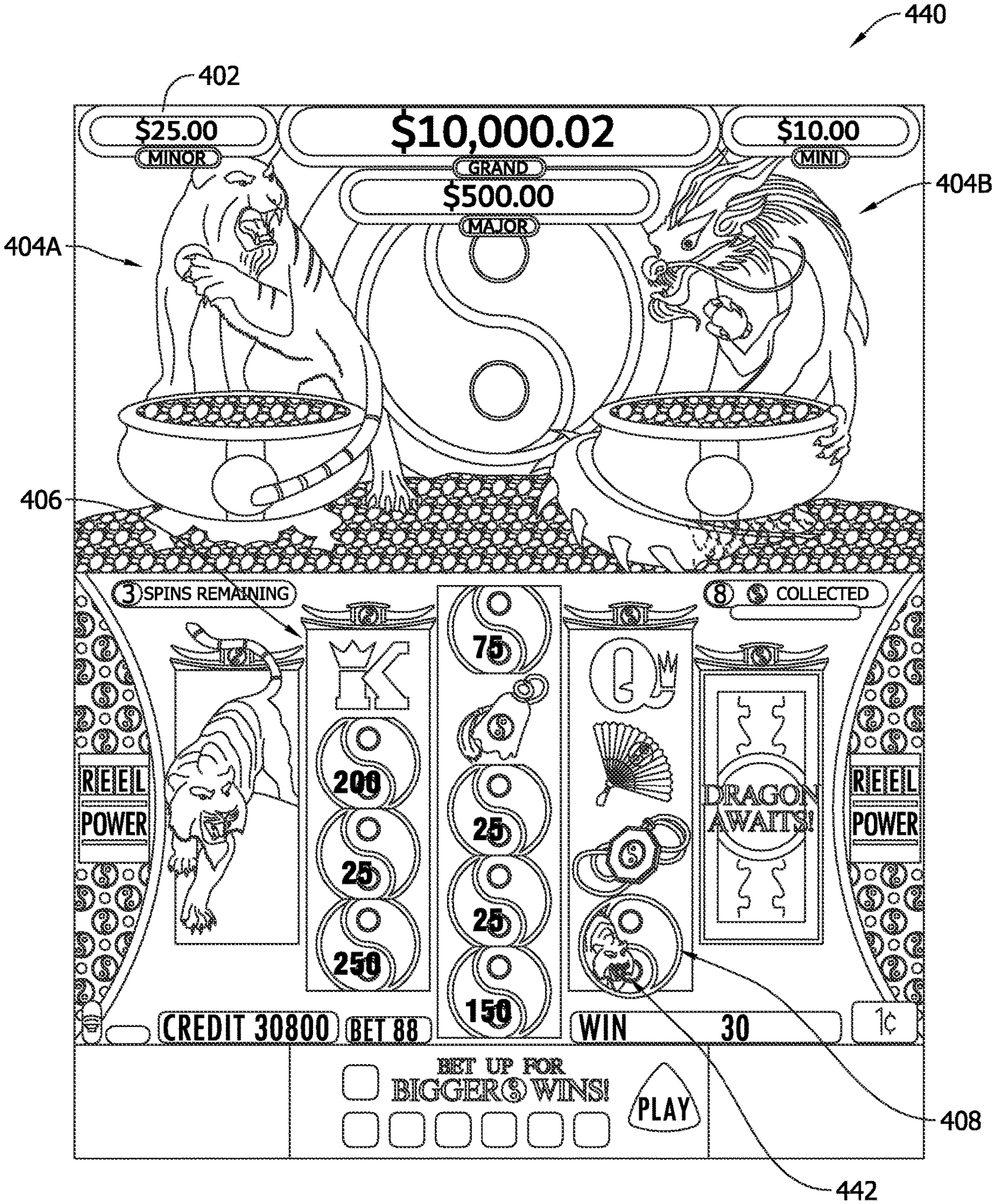

The screenshot 440 shown in FIG. 4D illustrates the appearance of a feature improvement symbol 442 as an interim feature value on a feature symbol 408. In some embodiments, the gaming device 200 may provide the chance for the appearance of a feature improvement symbol 442 when determining a feature value 426 for a new feature symbol 408. In this example, the feature improvement symbol 442 is a small tiger for the tiger metamorphic 404A and a small dragon for the dragon metamorphic 404B. The feature improvement symbol 442 is displayed over the swirl portion of the feature symbol 408 that is associated with the active metamorphic feature 404. In the illustrated example, the small tiger feature improvement symbol 442 is displayed on the first swirl portion (e.g., the green swirl) of the feature symbol 408. In situations where the dragon metamorphic 404B is additionally and/or alternatively active, the small dragon feature improvement symbol 442 is displayed on the second swirl portion (e.g., the red swirl) of the feature symbol 408. The appearance of the feature improvement symbol 442 causes an improvement to feature values 426 on one or more of the other feature symbols 408. The gaming device 200 may determine which feature symbols 408 to improve (e.g., based on a generated RNG outcome, weighted table, or the like).

Figure 4E:
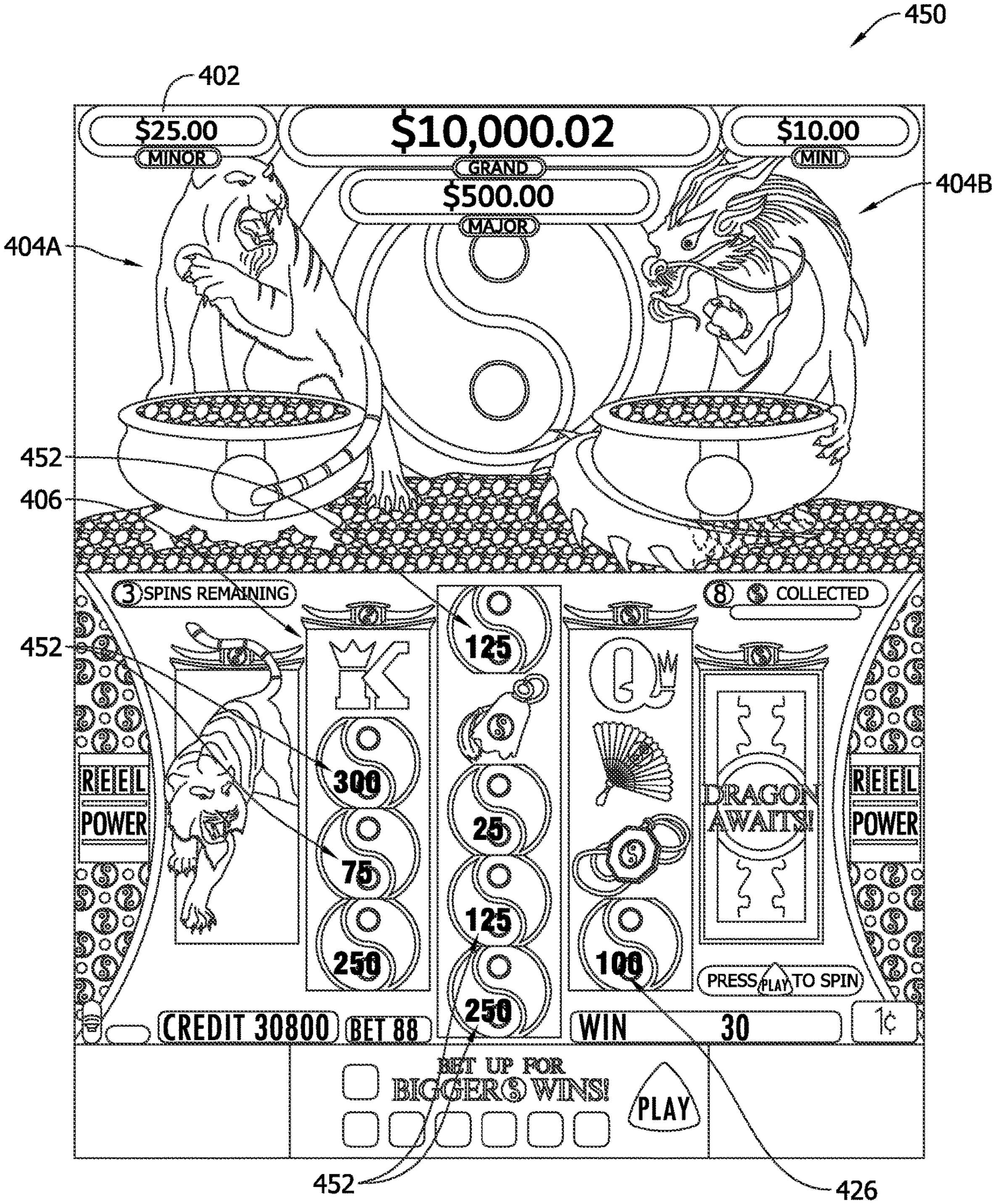

The screenshot 450 shown in FIG. 4E illustrates the outcome after the gaming device 200 has processed the feature improvement symbol 442 shown in FIG. 4D. More specifically, the feature values 426 of several of the feature symbols 408 in the play area 406 have been improved or have increased (e.g., with incremental values being applied to the pre-existing feature values 426), and are illustrated here as improved feature values 452. After improving one or more of the feature symbols 408, the gaming device 200 replaces the feature improvement symbol 442 (e.g., the small tiger) with a feature value 426 (shown in FIG. 4E).

Figure 4F:
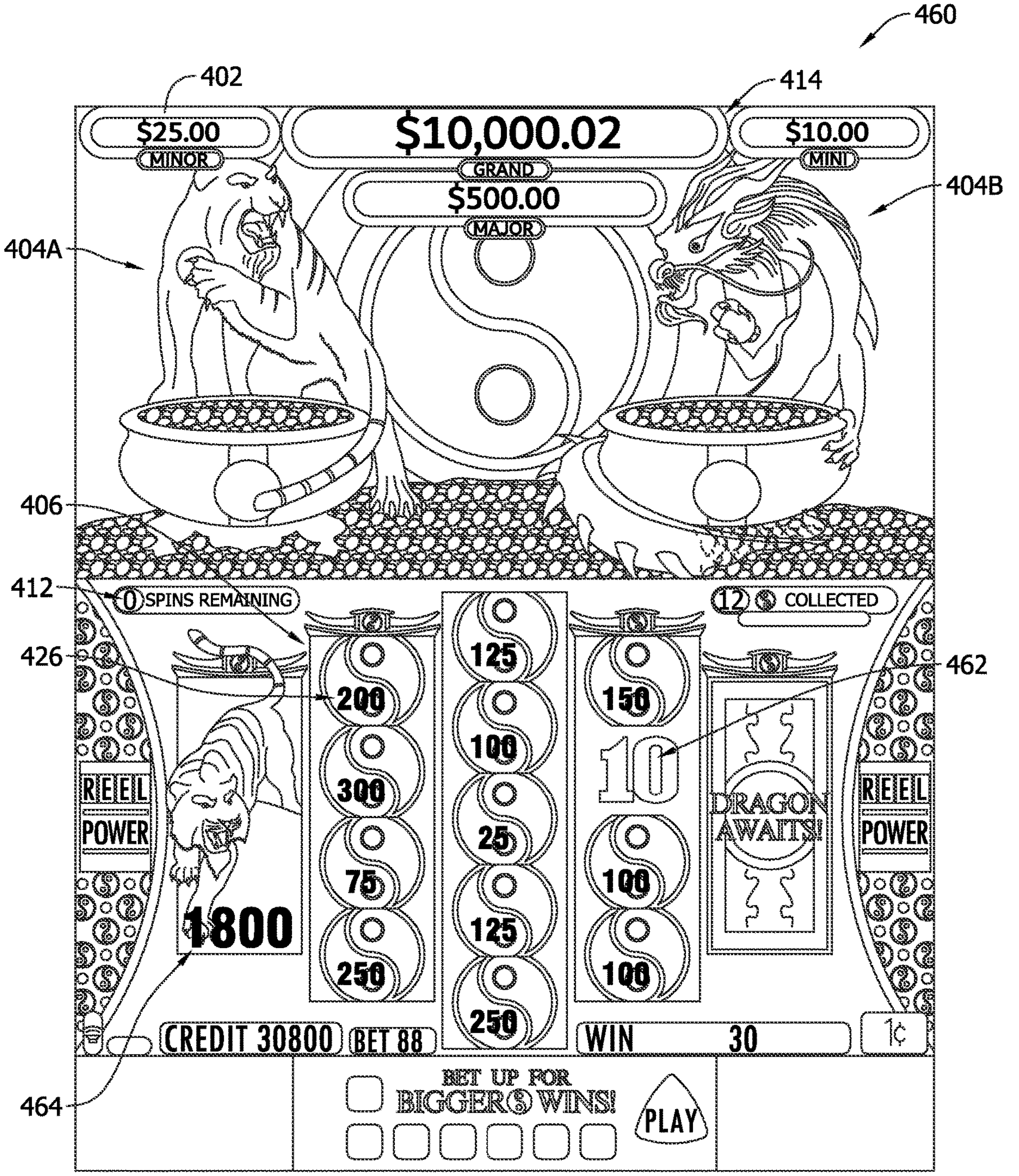

As the hold-and-spin feature game continues, the symbol positions in the play area 406 may continue to fill up with more feature symbols 408 that appear during a round of the hold-and-spin feature and are held in the play area 406 during a subsequent round of the hold-and-spin feature game. At some point, the feature game comes to a conclusion, either by the player exhausting their available free spins, or by filling up all of the symbol positions in the play area 406 with feature symbols 408. In the screenshot 460 shown in FIG. 4F, the feature game has concluded with only one symbol position 462 in the play area 406 not having a feature symbol 408. The free spin counter 412 is reduced to zero free spins, indicating that the feature game has concluded. Upon conclusion of the feature game, the gaming device 200 computes an award value 464. In the example embodiment, the player is awarded all of the feature values 426 and 452 appearing at the end of the feature game. More specifically, the gaming device 200 computes an award value 464 for each of the active metamorphic features 404. In this example, only the tiger metamorphic 404A is active. As such, the gaming device 200 computes the sum of all of the feature values 426 and 452 shown for the tiger metamorphic 404A (e.g., all of values displayed on the first swirl portions of the feature symbols 408) and displays that sum total as the award value 464 for the tiger metamorphic 404A. In some embodiments, one or more of the feature values may identify a jackpot award (e.g., mini, minor, major, grand). In such situations, the gaming device 200 also adds the current value of that particular jackpot award to the award value 464. The current value of available jackpot awards may be displayed in a jackpot area 414 on the graphical user interface 402 (e.g., above the metamorphic features 404 as shown in FIG. 4F). In some embodiments, the gaming device 200 may provide an animation that illustrates the computation of each award value 464, such as an animation effect flashing from each individual feature value 426 and 452 to the award value 464 as the feature values 426 and 452 are being added to the award value 464, thereby allowing the player to understand that those feature values 426 and 452 are being applied to compute the award value. Upon determining the award value(s) 464, the gaming device 200 provides the award value(s) 464 to the credit balance of the player or otherwise triggers a payout to the player.

Figure 5A:
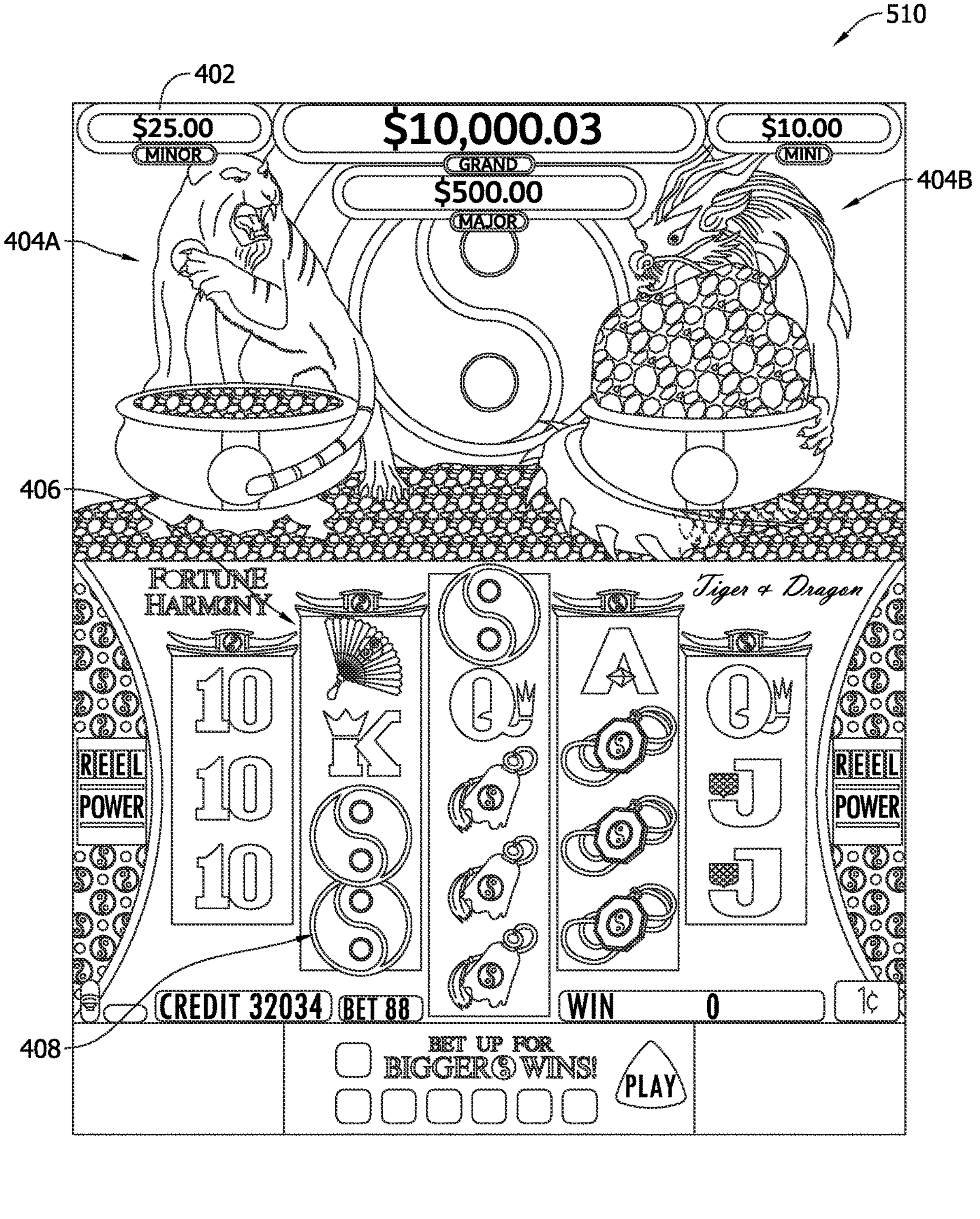
FIGS. 5A-5E are example screenshots or user interfaces that illustrate a situation of the electronic game that includes metamorphic features with the reel-based game such as shown in FIGS. 4A-4F in which an inactive metamorphic feature becomes activated during feature game play.
Figure 5B:
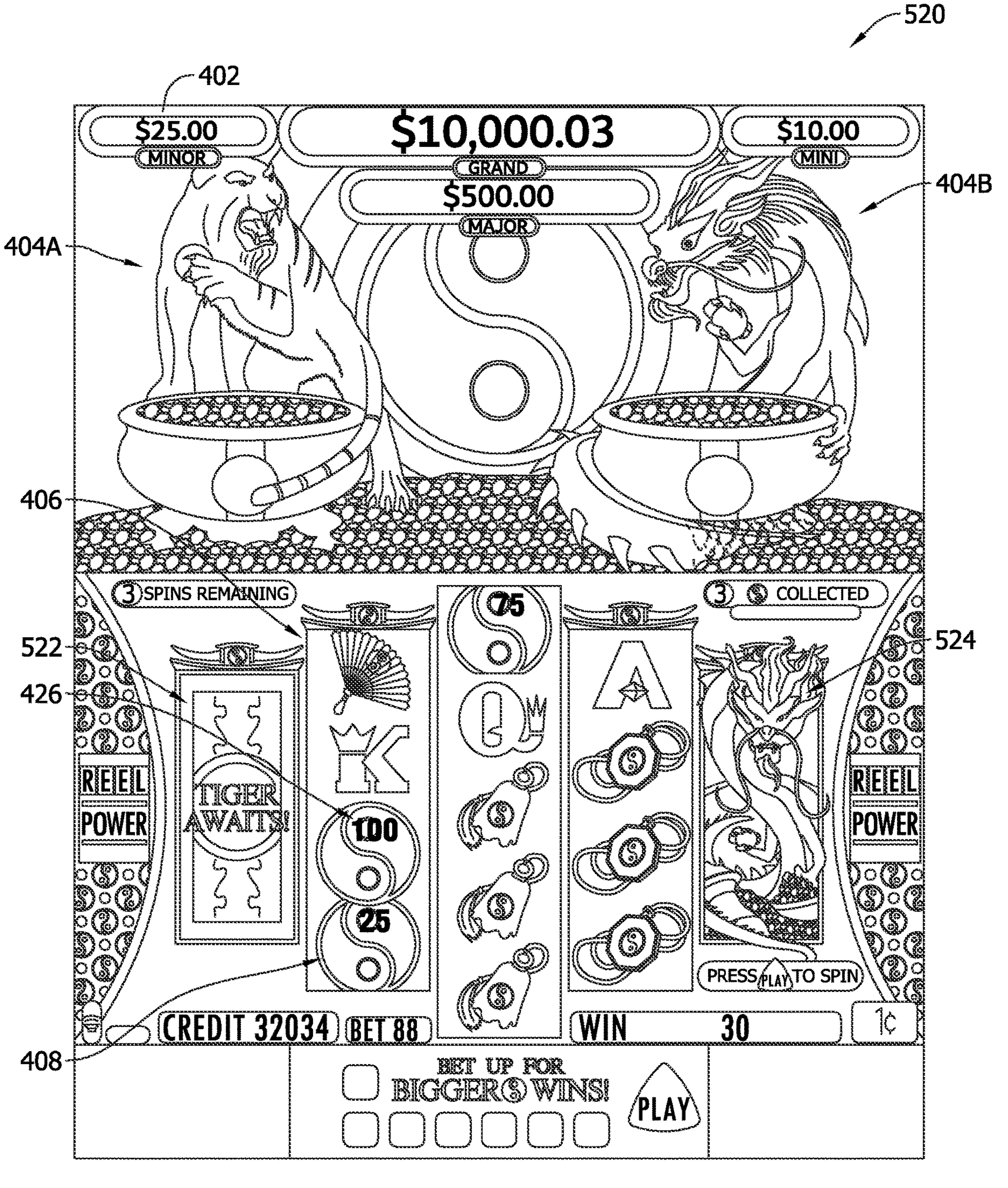

In the example embodiment, the gaming device 200 provides chances for an inactive metamorphic feature 404 to become activated during play of the feature game. FIGS. SA-SE are example screenshots 510, 520, 530, 540, 550 that illustrate a situation in which an inactive metamorphic feature 404 (e.g., the tiger metamorphic 404A in the illustrated example) becomes activated during feature game play. The sequence of FIGS. 5A-5E begins with the screenshot 510 shown in FIG. 5A which, similar to the screenshot 410 of FIG. 4A, illustrates a base game spin outcome that includes three feature symbols 408 appearing in the play area 406. In this example, the feature game is triggered with the dragon feature 404B active, and with the tiger feature 404A inactive. The screenshot 520 of FIG. 5B shows the beginning of the feature game, within which the dragon metamorphic 404B is initially active and the tiger metamorphic 404A is initially inactive. As described above, when the feature game starts, the gaming device 200 displays a visual indication via the graphical user interface 402 of the metamorphic(s) 404 that are active and the metamorphic(s) 404 that are inactive at the start of the feature game. As shown in FIG. 5B, in the example embodiment, a dragon image 524 replaces a fifth reel (e.g., the right-most reel or the fifth reel 424 described above with reference to FIG. 4B) in the play area 406 to indicate that the dragon metamorphic 404B is initially active and a "tiger awaits" image 522 replaces a first reel (e.g., the left-most reel or the first reel 422 described above with reference to FIG. 4B) in the play area 406 to indicate that the tiger metamorphic 404A is initially inactive. Further, the second swirl portions (e.g., the red swirls or top-right sections) of each of the feature symbols 408 are populated with feature values 426, similar to the first swirl portions of the feature symbols 408 that are populated with the features values 426 as shown in FIG. 4B and described above.

Figure 5C:
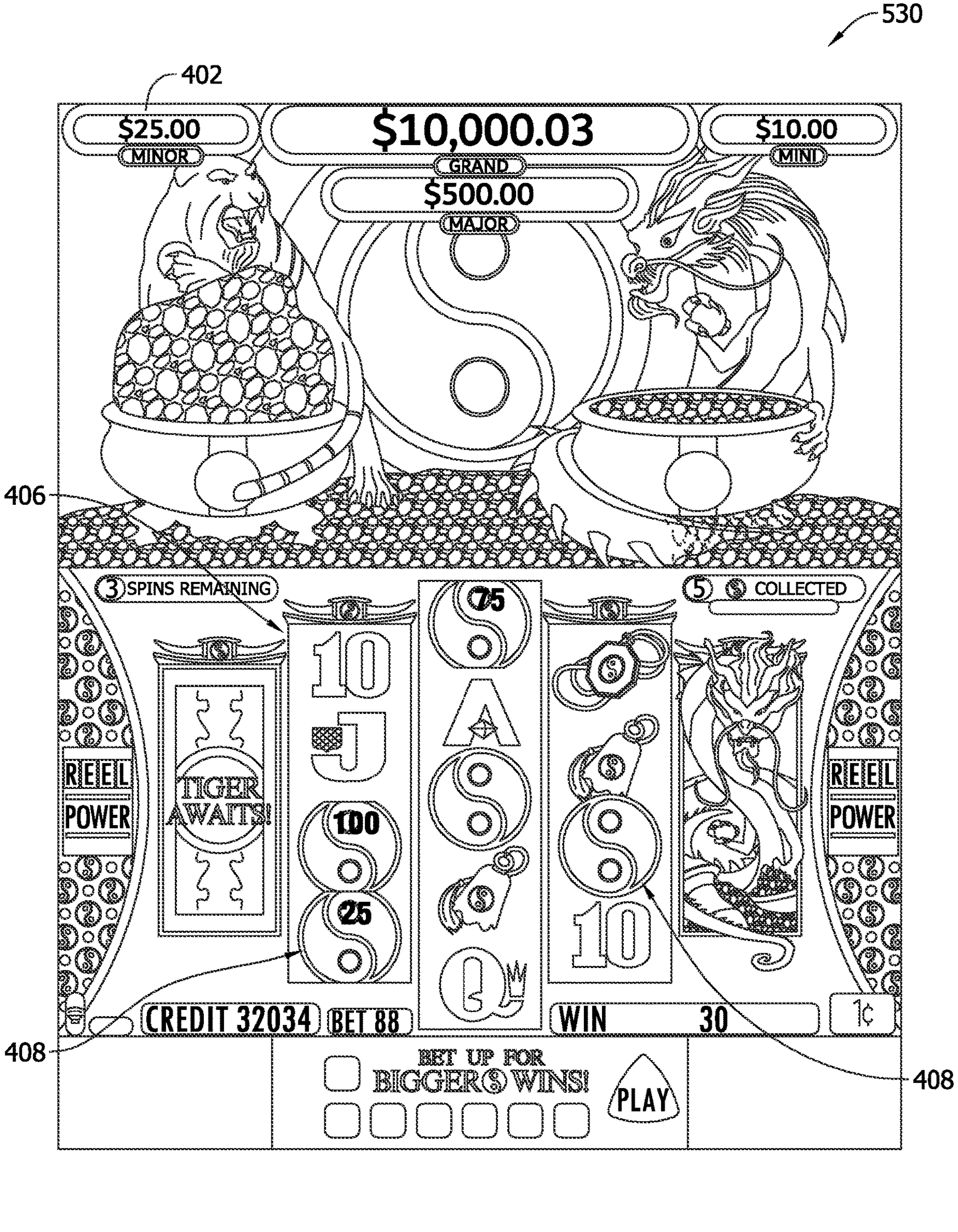

In the screenshot 530 shown in FIG. 5C, the appearance of two new feature symbols 408 during a round of the hold-and-spin feature game is shown. In this example embodiment, when one or more new feature symbols 408 appears during play of the feature game, the gaming device 200 provides additional opportunities for the inactive metamorphic feature 404 (e.g., the tiger metamorphic 404A) to become activated as well. In the example embodiment, the appearance of at least one new feature symbol 408 during the hold-and-spin feature game may trigger the gaming device 200 to randomly determine, by generating an RNG outcome or RNG outcomes for example, whether the inactive metamorphic feature 404 (e.g., the tiger metamorphic 404A) is activated as a result. A single RNG outcome may be generated for the one or more feature symbols 408 that appears during a round of the feature game, or an RNG outcome may be generated for each feature symbol 408 that appears, as described above for the appearance of feature symbol(s) 408 during the base game. Moreover, in some embodiments, the trigger threshold or weighted table used to generate the RNG outcome(s) for determining whether the inactive metamorphic feature 404 is activated may be the same as those used for the same metamorphic feature 404 during the base game, or a separate threshold or separate weight table with differing triggering chances may be used for the inactive metamorphic feature 404 during the feature game. In other embodiments, the appearance of at least one new feature symbol 408 during the hold-and-spin feature game may trigger the gaming device 200 to automatically activate the inactive metamorphic feature 404.

Figure 5D:
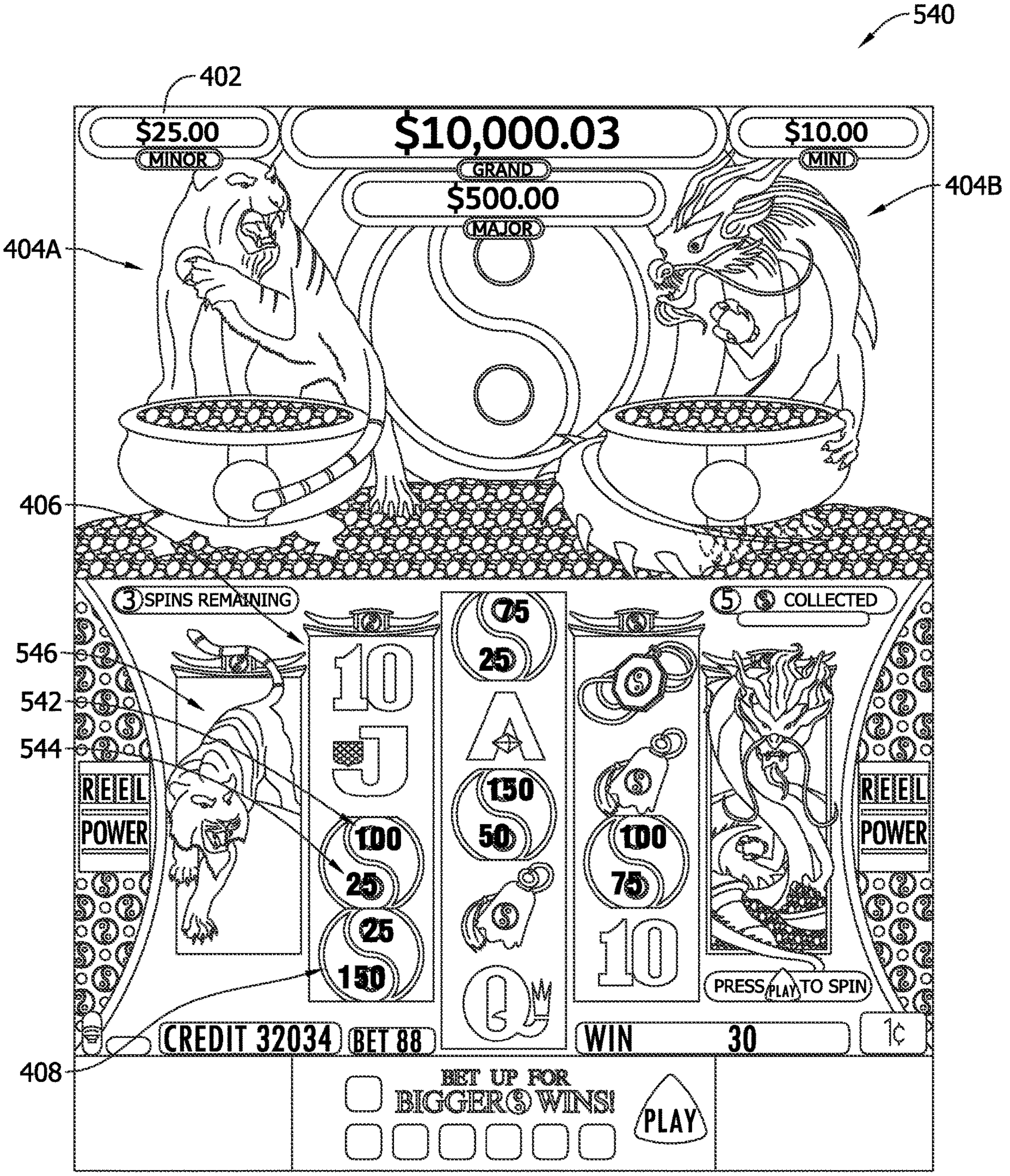

Here, the spin result illustrated in FIG. 5C causes the inactive metamorphic feature 404 (e.g., the tiger metamorphic 404A) to activate. When the inactive metamorphic feature 404 becomes activated, the gaming device 200 displays an image to indicate that activation (e.g., the "tiger awaits" image 522 is replaced with a tiger image 546 as shown in FIG. 5D). Further, in addition to populating each of the second swirl portions (e.g., the red swirls) of the feature symbols 408 with feature values 426 (e.g., as described above), the gaming device 200 also populates the first swirl portions (e.g., the green swirls) of the feature symbols 408 existing in the play area 406 with feature values 426. As such, since both metamorphic features 404A, 404B are now activated, each feature symbol 408 in the play area 406 is populated with two feature values 426, one for the tiger metamorphic 404A and one for the dragon metamorphic 404B. FIG. 5D shows an example first feature value 542 and a second feature value 544 on the same feature symbol 408. Moreover, as shown in FIG. 5D, in the example embodiment, the feature symbols 408 that appeared or existed in the play area 406 prior to the tiger metamorphic 404A becoming activated are retroactively populated with feature values 426 in the first swirl portions that are associated with the newly activated tiger metamorphic 404A. In other embodiments, the feature symbols 408 that appeared or existed in the play area 406 prior to the inactive metamorphic feature 404 becoming activated may not be retroactively populated with feature values 426 in the swirl portions associated with the newly activated metamorphic feature 404, and only feature symbols 408 that appear in the play area 406 in conjunction with or subsequent to the inactive metamorphic feature 404 becoming active may be populated with feature values 426 in the swirl portion associated with that metamorphic feature 404.

Figure 5E:
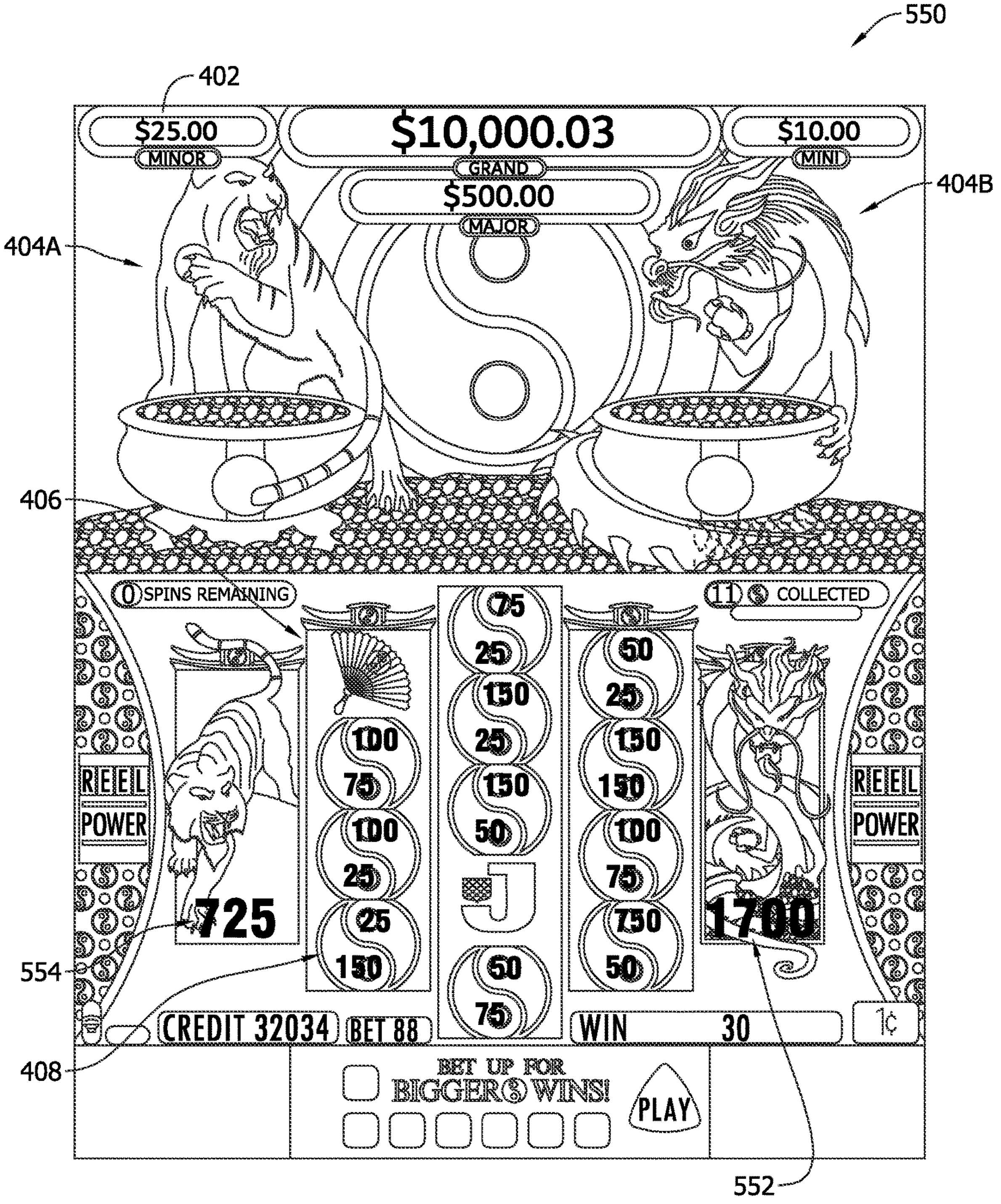

The screenshot 550 of FIG. 5E shows the final result of the feature game. Since both metamorphic features 404A, 404B are active at the end of the feature game, the gaming device 200 generates separate award values for each of the two metamorphic features 404A, 404B. More specifically, the gaming device 200 computes a first award value 552 for the dragon metamorphic 404B and a second award value 554 for the tiger metamorphic 404A, where each award value 552, 554 represents the total value of all of the feature values for that particular metamorphic feature 404. In this example, the dragon metamorphic 404B yields an award value 552 of 1700 credits and the tiger metamorphic 404A yields an award value 554 of 725 credits. The award values 552 and 554 are displayed on the graphical user interface 402 (e.g., on or adjacent the dragon metamorphic 404B and the tiger metamorphic 404A, respectively).

Figure 6:
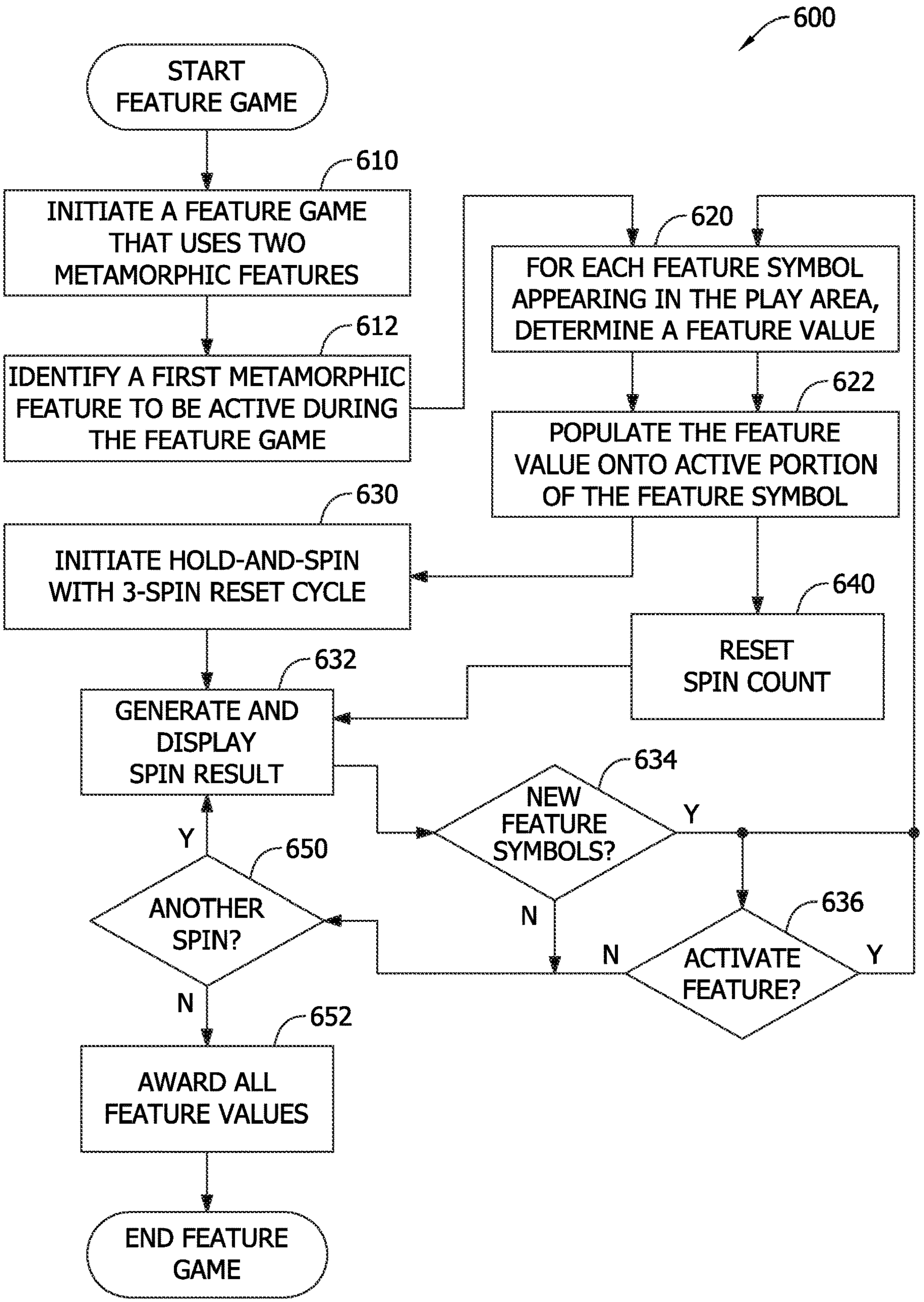
FIG. 6 is an example method for providing an electronic game that includes metamorphic features with a reel-based game such as shown in FIGS. 4A-5E.

FIG. 6 is an example method 600 for providing an electronic game that includes metamorphic features with a reel-based game such as shown in FIGS. 4A-5E. In some embodiments, the electronic game may be provided on a gaming device (e.g., gaming devices 104A-104X in FIG. 1 and/or gaming device 200 and/or the mobile computing devices 256, 264 in FIG. 2). The example method 600 may be implemented in a server (e.g., server 102) and/or the gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 can store one or more game programs 206 that provide program instructions and/or data for carrying out various implementations (e.g., game mechanics) that, when executed by the processor 204, cause the processor 204 to perform certain operations to perform the method 600.

In the example embodiment, the method 600 is implemented by the gaming device or EGM 200 to provide the electronic game on the EGM 200. At operation 610, the EGM 200 initiates the feature game (e.g., when the player achieves a spin result of a base game having one or more feature symbols 408 appearing in a play area displayed on the EGM 200, such as shown in FIGS. 4A and 5A). As described above, the EGM 200 may randomly determine (e.g., by generating one or more RNG outcomes) whether the feature game is triggered when one or more feature symbols 408 appear in a play area in a base game spin result. In some embodiments, a predefined or preselected number of feature symbols 408 (e.g., at least three feature symbols 408) may be required to appear to initially trigger a chance (e.g., to cause the EGM 200 to generate one or more RNG outcomes) for the feature game. In other embodiments, only one feature symbol 408 needs to appear in the base game spin result to initially trigger a chance for the feature game.

In some embodiments, the EGM 200 may provide a single chance for triggering the feature game (e.g., generate a single RNG outcome for determining whether to trigger the feature game) whenever one or more feature symbols 408 appear in a result of the base game. In other embodiments, the EGM 200 may provide a chance for each of the two metamorphic features 404 to trigger the feature game whenever one or more feature symbols 408 appear in a result of the base game (e.g., the EGM 200 may generate at least one RNG outcome for the tiger metamorphic 404A and at least one RNG outcome for the dragon metamorphic 404B for determining whether to trigger the feature game whenever one or more feature symbols 408 appear). In some embodiments, the EGM 200 may provide a chance for each feature symbol 408 that appears in a result of the base game to trigger the feature game (e.g., the EGM 200 may generate at least one RNG outcome for each feature symbol 408 that appears). For example, the EGM 200 may generate three RNG outcomes for determining whether to trigger the feature game in response to three feature symbols 408 appearing in a spin result of the base game. In some embodiments, the EGM 200 may provide a chance for each of the two metamorphic features 404 to trigger the feature game for each of the feature symbols 408 that appears in a result of the base game. For example, when three feature symbols 408 appear in a result of the base game, the EGM 200 may generate two RNG outcomes (one for each of the two metamorphic feature 404) for each of three feature symbols 408 (six RNG outcome totals).

At operation 612, the EGM 200 identifies one or more metamorphic features to be active during the feature game (e.g., the tiger metamorphic 404A, the dragon metamorphic 404B, or both). In embodiments where the feature game activation chances are provided for each metamorphic feature 404, the EGM 200 may identify the metamorphic feature 404 associated with whichever chance caused the feature game to be activated to be active when the feature game begins. For example, as described above, the gaming device may generate at least one RNG outcome for each of the two metamorphic features 404 to determine whether to trigger the feature game, and the EGM 200 may identify the metamorphic feature 404 associated with the RNG outcome that triggers the feature game to be active at the start of the feature game. In such embodiments, it may be possible for RNG outcomes associated with both metamorphic features to trigger the feature game. In response, the EGM 200 may randomly determine which of (e.g., which one or both of) the metamorphic features 404 are active when the feature game starts (e.g., based on a weighted table that includes options for one, the other, or both of the features 404 to be active). During initiation of the feature game, the EGM 200 generates and displays a visual indication of the metamorphic features 404 that are initially active. The EGM 200 may also generate and display a visual indication of the metamorphic features 404 that are initially inactive.

At operation 620, the EGM 200 determines a feature value 426 for each feature symbol 408 initially appearing at the start of the feature game (e.g., the three or more feature symbols 408 that activated the feature game), and for each metamorphic feature 404 that has been activated (e.g., in the case where multiple metamorphic features 404 were activated at initiation of the feature game). At operation 622, each of these feature values 426 are added to their respective feature symbols 408, and particularly to the associated activated portion of the feature symbol 408 (e.g., feature values 426 associated with the tiger metamorphic 404A appearing over the first swirl portion of the feature symbol 408 and feature values 426 associated with the dragon metamorphic appear over the second swirl portion of the feature symbol 426). As such, the feature game is ready for player participation.

At operation 630, the EGM 200 initiates a hold-and-spin loop with a 3-spin reset. While the feature game includes a 3-spin reset, more or fewer spins may be included in the feature game (e.g., one free spin, two free spins, four free spins, five free spins, and so on). In the example embodiment, the player begins the feature game with three free spins. At operation 632, the EGM 200 generates and displays a spin result (e.g., holding any existing feature symbols 408 and spinning the reels to update the remaining symbol positions). At test 634, if any new feature symbols 408 appear, the EGM 200 processes the new feature symbols 408. For any new feature symbols appearing, at operation 620, the EGM 200 determines a feature value 426 for each of those new feature symbols 408, and particularly for each of the activated metamorphic features 404, and the EGM 200 populates those feature values 426 onto the new feature symbols 408 at operation 622. Upon a new feature symbol appearing, the EGM 200 resets the spin counter at operation 640 (e.g., resetting to three spins) and returns to operation 632 for further spins.

In some embodiments, where the appearance of one or more new feature symbols 408 appears in spin result and there is an inactive metamorphic feature 404, the EGM 200 provides a chance to activate that inactive feature 404 (e.g., one chance for any number of new feature symbols appearing, one chance for each new feature symbol appearing). At test 636, if an inactive feature is activated, the EGM 200 activates that feature 404, determines feature values 426 for each of the feature symbols 408 currently appearing at operation 620, and populates those feature values 426 onto the newly activated portions of those feature symbols 408 at operation 622.

When spins generate no new feature symbols at test 634, the EGM 200 decrements the spin counter by one and determines, at test 650, whether there are any remaining spins. If there are remaining spins, the EGM 200 returns to operation 632 and continues the feature game. When there are no more spins remaining, or when all of the symbol positions have already been populated with feature symbols 408, the EGM 200 awards all feature values 426 that appear in the final result at operation 652 and terminates the feature game, returning then to the base game.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g., an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:

at least one display device configured to display an electronic game that includes a base game, a feature game, and a plurality of metamorphic features; and a game controller configured to execute instructions stored in at least one memory that, when executed, cause the game controller to:

determine that the feature game is triggered based on a result of the base game and initiate the feature game in response thereto;

during initiation of the feature game, identify one or more metamorphic features of the plurality of metamorphic features to be active during the feature game;

cause display of a visual indication of the one or more active metamorphic features;

for each feature symbol appearing in a play area during the feature game, determine a feature value for each active metamorphic feature and add the feature value to a portion of the feature symbol associated with a respective active metamorphic feature; and upon conclusion of the feature game, generate an award total for each active metamorphic feature and provide the award total for each active metamorphic feature.

2. The electronic gaming machine of claim 1, wherein the instructions, when executed, further cause the game controller to randomly determine that the feature game is triggered in response to one or more feature symbols appearing in the play area in the result of the base game and initiate the feature game in response thereto.

3. The electronic gaming machine of claim 2, wherein the instructions, when executed, further cause the game controller to:

cause display of the one or more feature symbols in the play area during initiation of the feature game; and for each of the one or more feature symbols displayed in the play area during initiation of the feature game, determine a feature value for each active metamorphic feature and add the feature value to a portion of the feature symbol associated with a respective active metamorphic feature.

4. The electronic gaming machine of claim 3, wherein the instructions, when executed, further cause the game controller to:

for each inactive metamorphic feature of the plurality of metamorphic features, determine whether to activate the inactive metamorphic feature during the feature game; and for each of the one or more feature symbols displayed in the play area during initiation of the feature game and for each feature symbol appearing in the play area during the feature game, determine another feature value for each metamorphic feature activated during the feature game and add the other feature value to another portion of the feature symbol associated with a respective metamorphic feature activated during the feature game.

5. The electronic gaming machine of claim 2, wherein the instructions, when executed, further cause the game controller to randomly determine that the feature game is triggered based on one or more random number generator (RNG) outcomes generated in response to the one or more feature symbols appearing in the play area in the result of the base game.

6. The electronic gaming machine of claim 5, wherein the instructions, when executed, further cause the game controller to generate, for each of the plurality of metamorphic features, at least one RNG outcome for randomly determining that the feature game is triggered in response to the one or more feature symbols appearing in the play area in the result of the base game.

7. The electronic gaming machine of claim 6, wherein the instructions, when executed, further cause the game controller to identify the one or more metamorphic features of the plurality of metamorphic features to be active during the feature game based on whether the at least one RNG outcome generated for a respective one of the plurality of metamorphic features triggers the feature game.

8. The electronic gaming machine of claim 7, wherein the instructions, when executed, further cause the game controller to, if an RNG outcome generated for one of the plurality of metamorphic features and an RNG outcome generated for another one of the plurality of metamorphic features both trigger the feature game, determine whether one or both of the one and the other one of the plurality of metamorphic features is active during the feature game.

9. The electronic gaming machine of claim 5, wherein the instructions, when executed, further cause the game controller to generate, in response to and for each of the one or more feature symbols appearing in the play area in the result of the base game, at least one RNG outcome for randomly determining that the feature game is triggered.

10. The electronic gaming machine of claim 1, wherein the instructions, when executed, further cause the game controller to:

for each inactive metamorphic feature of the plurality of metamorphic features, determine whether to activate the inactive metamorphic feature during the feature game; and for each feature symbol appearing in the play area during the feature game, determine another feature value for each metamorphic feature activated during the feature game and add the other feature value to another portion of the feature symbol associated with a respective metamorphic feature activated during the feature game.

11. The electronic gaming machine of claim 10, wherein the instructions, when executed, further cause the game controller to, for each inactive metamorphic feature of the plurality of metamorphic features, randomly determine whether to activate the inactive metamorphic feature during the feature game in response to a feature symbol appearing in the play area during the feature game.

12. The electronic gaming machine of claim 1, wherein the feature game includes a number of free spins in the play area, and wherein the instructions, when executed, further cause the game controller to reset the number of free spins in response to a feature symbol appearing in the play area during the feature game.

13. A non-transitory computer-readable medium containing instructions stored thereon, which when executed by a processor, cause the processor to:

control a display device to display an electronic game that includes a feature game, a base game, and a plurality of metamorphic features;

determine that the feature game is triggered based on a result of the base game and initiate the feature game in response thereto;

during initiation of the feature game, identify one or more metamorphic features of the plurality of metamorphic features to be active during the feature game;

control the display device to display a visual indication of the one or more active metamorphic features;

for each feature symbol appearing in a play area during the feature game, determine a feature value for each active metamorphic feature and add the feature value to a portion of the feature symbol associated with a respective active metamorphic feature; and upon conclusion of the feature game, generate an award total for each active metamorphic feature and provide the award total for each active metamorphic feature.

14. The non-transitory computer-readable medium of claim 13, wherein the instructions, when executed, further cause the processor to randomly determine that the feature game is triggered in response to one or more feature symbols appearing in the play area in the result of the base game and initiate the feature game in response thereto.

15. The non-transitory computer-readable medium of claim 14, wherein the instructions, when executed, further cause the processor to:

control the display device to display the one or more feature symbols in the play area during initiation of the feature game; and for each of the one or more feature symbols displayed in the play area during initiation of the feature game, determine a feature value for each active metamorphic feature and add the feature value to a portion of the feature symbol associated with a respective active metamorphic feature.

16. The non-transitory computer-readable medium of claim 14, wherein the instructions, when executed, further cause the processor to randomly determine that the feature game is triggered based on one or more random number generator (RNG) outcomes generated in response to the one or more feature symbols appearing in the play area in the result of the base game.

17. The non-transitory computer-readable medium of claim 16, wherein the instructions, when executed, further cause the processor to generate, for each of the plurality of metamorphic features, at least one RNG outcome for randomly determining that the feature game is triggered in response to the one or more feature symbols appearing in the play area in the result of the base game.

18. The non-transitory computer-readable medium of claim 13, wherein the instructions, when executed, further cause the processor to:

for each inactive metamorphic feature of the plurality of metamorphic features, determine whether to activate the inactive metamorphic feature during the feature game; and for each feature symbol appearing in the play area during the feature game, determine another feature value for each metamorphic feature activated during the feature game and add the other feature value to another portion of the feature symbol associated with a respective metamorphic feature activated during the feature game.

19. A computer-implemented method for providing an electronic game on an electronic gaming device, the method comprising:

controlling a display device to display the electronic game that includes a feature game, a base game, and a plurality of metamorphic features;

determining that the feature game is triggered based on a result of the base game and initiating the feature game in response thereto;

during initiation of the feature game, identifying one or more metamorphic features of the plurality of metamorphic features to be active during the feature game;

controlling the display device to display a visual indication of the one or more active metamorphic features;

for each feature symbol appearing in a play area during the feature game, determining a feature value for each active metamorphic feature and adding the feature value to a portion of the feature symbol associated with a respective active metamorphic feature; and upon conclusion of the feature game, generating an award total for each active metamorphic feature and providing the award total for each active metamorphic feature.

20. The method of claim 19, further comprising:

randomly determining that the feature game is triggered in response to one or more feature symbols appearing in the play area in the result of the base game and initiating the feature game in response thereto;

controlling the display device to display the one or more feature symbols in the play area during initiation of the feature game;

for each of the one or more feature symbols displayed in the play area during initiation of the feature game, determining a feature value for each active metamorphic feature and adding the feature value to a portion of the feature symbol associated with a respective active metamorphic feature;

for each inactive metamorphic feature of the plurality of metamorphic features, determining whether to activate the inactive metamorphic feature during the feature game; and for each of the one or more feature symbols displayed in the play area during initiation of the feature game and for each feature symbol appearing in the play area during the feature game, determining another feature value for each metamorphic feature activated during the feature game and adding the other feature value to another portion of the feature symbol associated with a respective metamorphic feature activated during the feature game.

* * * * *